US010428899B2

United States Patent
Wei et al.

(10) Patent No.: US 10,428,899 B2
(45) Date of Patent: Oct. 1, 2019

(54) WINDOW COVERING SYSTEM AND WINDOW COVERING CONTROL APPARATUS THEREOF

(71) Applicant: Nien Made Enterprise Co., Ltd., Taichung (TW)

(72) Inventors: Shui-Dong Wei, TaiChung (TW); Keng-Hao Nien, TaiChung (TW)

(73) Assignee: NIEN MADE ENTERPRISE CO., LTD., Taichung (TW)

( * ) Notice: Subject to any disclaimer, the term of this patent is extended or adjusted under 35 U.S.C. 154(b) by 257 days.

(21) Appl. No.: 15/406,795

(22) Filed: Jan. 16, 2017

(65) Prior Publication Data
US 2017/0211319 A1   Jul. 27, 2017

Related U.S. Application Data

(60) Provisional application No. 62/318,771, filed on Apr. 6, 2016.

(30) Foreign Application Priority Data

Jan. 22, 2016 (CN) .................... 2016 2 0065142 U

(51) Int. Cl.
*E06B 9/322* (2006.01)
*F16F 15/18* (2006.01)
(Continued)

(52) U.S. Cl.
CPC .......... *F16F 15/18* (2013.01); *B65H 75/486* (2013.01); *E06B 9/307* (2013.01); *E06B 9/322* (2013.01);
(Continued)

(58) Field of Classification Search
CPC .... B65H 75/486; F16F 9/125; F16F 2222/00; F16F 2222/04; F16F 2222/06;
(Continued)

(56) References Cited

U.S. PATENT DOCUMENTS 4,444,242 A * 4/1984 Amsler ...................... E06B 9/32
160/172 R
4,681,279 A   7/1987 Nakamura
(Continued)

FOREIGN PATENT DOCUMENTS

AU             782302 B2    7/2005
AU         2012370499 A1    9/2014
(Continued)

OTHER PUBLICATIONS

Examination Report dated Feb. 11, 2019, corresponding Application No. 201710023830X.

*Primary Examiner* — Johnnie A. Shablack
(74) *Attorney, Agent, or Firm* — Muncy, Geissler, Olds & Lowe, PC

(57) ABSTRACT

In a window covering system and a window covering control apparatus thereof, the window covering control apparatus comprises a driving module, a damping output module, and a damping control module. The damping output module and the driving module are configured to operate simultaneously. The driving module may drive the damping output module to provide damping to the driving module. The damping control module comprises a control detecting unit and a fitting unit. The control detecting unit comprises a detecting portion and a stopper portion, which are detachably engaged. During an expansion of a covering material, the driving module drives the damping output module to provide damping to the driving module; when the stopper portion is driven apart by the detecting portion from the fitting unit, the driving module operates independently of the damping output module to stop the damping output module from providing damping.

23 Claims, 18 Drawing Sheets

(51) Int. Cl.
*B65H 75/48* (2006.01)
*E06B 9/307* (2006.01)
*E06B 9/324* (2006.01)
*F16F 9/12* (2006.01)
*E06B 9/388* (2006.01)
*E06B 9/80* (2006.01)

(52) U.S. Cl.
CPC .............. *E06B 9/324* (2013.01); *F16F 9/125* (2013.01); *E06B 9/388* (2013.01); *E06B 2009/3222* (2013.01); *E06B 2009/807* (2013.01); *F16F 2222/04* (2013.01); *F16F 2222/06* (2013.01); *F16F 2222/12* (2013.01); *F16F 2224/025* (2013.01); *F16F 2224/045* (2013.01)

(58) Field of Classification Search
CPC ... F16F 15/18; F16F 15/03; E06B 2009/3222; E06B 2009/807; E06B 2009/905; E06B 9/322; E06B 9/325; E06B 9/324; E06B 9/30; E06B 9/82; E06B 9/90
USPC ................ 160/168.1 R, 168.1 P, 170, 173 R, 160/178.1 R, 177 R
See application file for complete search history.

(56) References Cited

U.S. PATENT DOCUMENTS

| | | |
|---|---|---|
| 5,123,472 A | 6/1992 | Nagashima et al. |
| 5,167,269 A * | 12/1992 | Abo .......... E06B 9/90 160/305 |
| 5,762,281 A * | 6/1998 | Foley .......... B65H 75/28 160/178.1 R |
| 6,129,131 A | 10/2000 | Colson |
| 6,155,328 A | 12/2000 | Welfonder |
| 6,332,491 B1 | 12/2001 | Rossini |
| 6,378,594 B1 * | 4/2002 | Yamanaka .......... E06B 9/80 160/238 |
| 6,715,528 B2 | 4/2004 | Rossini |
| 6,948,544 B2 | 9/2005 | Nien |
| 6,955,207 B2 | 10/2005 | Minder |
| 7,025,107 B2 * | 4/2006 | Ciuca .......... E06B 9/303 160/170 |
| 7,198,089 B2 | 4/2007 | Hsu |
| 7,228,797 B1 * | 6/2007 | Hillman .......... E06B 9/322 100/170 |
| 7,331,370 B1 * | 2/2008 | Militello .......... E06B 9/322 160/170 |
| 7,341,091 B2 | 3/2008 | Nien Ming |
| 7,406,995 B2 | 8/2008 | Huang |
| 7,578,334 B2 | 8/2009 | Smith et al. |
| 7,717,154 B2 | 5/2010 | Cheng |
| 8,230,896 B2 | 7/2012 | Anderson |
| 8,267,145 B2 | 9/2012 | Fraser |
| 8,746,320 B2 * | 6/2014 | Yu .......... E06B 9/322 160/170 |
| 8,893,763 B2 * | 11/2014 | Huang .......... E06B 9/80 160/170 |
| 9,062,492 B2 | 6/2015 | Yu |
| 9,127,500 B2 | 9/2015 | Huang |
| 9,217,282 B2 * | 12/2015 | Defenbaugh .......... E06B 9/68 |
| 9,260,912 B2 * | 2/2016 | Huang .......... E06B 9/322 |
| 9,284,774 B2 | 3/2016 | Yu et al. |
| 9,366,077 B2 * | 6/2016 | Chen .......... F16H 31/001 |
| 10,151,140 B2 * | 12/2018 | Chen .......... E06B 9/322 |
| 2002/0088562 A1 | 7/2002 | Palmer |
| 2006/0000561 A1 * | 1/2006 | Anderson .......... E06B 9/262 160/168.1 R |
| 2007/0227677 A1 * | 10/2007 | Yu .......... E06B 9/322 160/170 |
| 2008/0099157 A1 * | 5/2008 | Nien .......... E06B 9/322 160/84.05 |
| 2009/0007830 A1 | 1/2009 | Sakuma et al. |
| 2009/0078380 A1 | 3/2009 | Cheng |
| 2009/0120592 A1 | 5/2009 | Lesperance |
| 2010/0206492 A1 * | 8/2010 | Shevick .......... E06B 9/30 160/170 |
| 2011/0290429 A1 | 12/2011 | Cheng |
| 2013/0032300 A1 * | 2/2013 | Yu .......... E06B 9/322 160/84.02 |
| 2013/0037225 A1 | 2/2013 | Huang |
| 2013/0087415 A1 | 4/2013 | Hsieh |
| 2014/0083631 A1 | 3/2014 | Huang |
| 2014/0131502 A1 | 5/2014 | Zhu |
| 2014/0291431 A1 | 10/2014 | Huang |
| 2015/0059992 A1 | 3/2015 | Liu |
| 2015/0136336 A1 | 5/2015 | Huang |
| 2015/0211296 A1 | 7/2015 | Zhang et al. |
| 2015/0354275 A1 | 12/2015 | Huang et al. |
| 2015/0368968 A1 | 12/2015 | Smith |
| 2016/0222727 A1 * | 8/2016 | Schiraldi .......... E06B 9/80 |
| 2017/0145743 A1 * | 5/2017 | Lei .......... B65H 75/26 |
| 2017/0183904 A1 * | 6/2017 | Schulman .......... E06B 9/322 |
| 2017/0211318 A1 * | 7/2017 | Chen .......... E06B 9/322 |
| 2017/0211320 A1 * | 7/2017 | Chen .......... E06B 9/322 |
| 2017/0211321 A1 * | 7/2017 | Chen .......... E06B 9/322 |
| 2017/0211657 A1 * | 7/2017 | Chen .......... E06B 9/322 |
| 2017/0226799 A1 * | 8/2017 | Hebeisen .......... E06B 9/80 |
| 2017/0292321 A1 * | 10/2017 | Chen .......... B65H 75/4434 |
| 2017/0292322 A1 * | 10/2017 | Chen .......... B65H 75/4434 |
| 2017/0298688 A1 * | 10/2017 | Chen .......... E06B 9/262 |
| 2018/0163463 A1 * | 6/2018 | Lin .......... E06B 9/262 |
| 2019/0063147 A1 * | 2/2019 | Cheng .......... B65H 75/486 |

FOREIGN PATENT DOCUMENTS

| | | |
|---|---|---|
| CA | 2805798 A1 | 8/2014 |
| CN | 101021139 B | 7/2010 |
| CN | 203161031 U | 8/2013 |
| CN | 204552565 U | 8/2015 |
| DE | 202007002787 U1 | 7/2008 |
| JP | H04250287 A | 9/1992 |
| JP | 1993018168 A | 1/1993 |
| JP | 2000145328 A | 5/2000 |
| JP | 2000220369 A | 8/2000 |
| JP | 3261106 B2 | 2/2002 |
| JP | 3378813 B2 | 2/2003 |
| JP | 3442670 B2 | 9/2003 |
| JP | 3485164 B2 | 1/2004 |
| JP | 2008013950 A | 1/2008 |
| JP | 4074420 B2 | 4/2008 |
| JP | 2013072183 A | 4/2013 |
| JP | 2013072224 A | 4/2013 |
| JP | 2015161147 A | 9/2015 |
| JP | 2015180810 A | 10/2015 |
| TW | I246415 B | 1/2006 |
| TW | M305849 U | 2/2007 |
| TW | I463961 B | 12/2014 |
| WO | 2010125951 A1 | 11/2010 |
| WO | 2016009881 A1 | 1/2016 |

* cited by examiner

WINDOW COVERING SYSTEM AND WINDOW COVERING CONTROL APPARATUS THEREOF

CROSS-REFERENCE TO RELATED APPLICATIONS

This application claims all benefits accruing under 35 U.S.C. § 119 from Chinese patent application No. 201620065142.0 filed on Jan. 22, 2016 and U.S. provisional application No. 62/318,771 filed on Apr. 6, 2016, the entirety of which are incorporated by reference herein.

FIELD

The present disclosure relates to a window covering control apparatus. More particularly, the present disclosure relates to a window covering control apparatus that is capable of controlling the expansion of a covering material of a window covering system to improve the smoothness of the expansion process.

BACKGROUND

Conventional cordless window coverings generally include a headrail, a bottom rail, a covering material, a spring box, and a damper. The covering material is hung between the headrail and the bottom rail. The covering material is collected or expanded through ascending or descending the bottom rail. Upon expansion of the covering material, the spring box is actuated by descending the bottom rail, and energy is stored in the spring box. While the damper is also actuated by the descending bottom rail to slow down the descending speed to avoid dropping the covering material too fast due to gravity, and thus preventing the covering material from striking objects or individuals below the window covering. Conversely, upon collection of the covering material, the energy stored in the spring box drives the bottom rail to ascend and return to the initial position.

During the descending of the bottom rail, the damper is activated to enable a slower descending speed of the bottom rail and prevent the bottom rail dropping by gravity. However, while the bottom rail descends away from the headrail, the weight of the covering material loaded on the bottom rail decreases gradually, resulting in a very slow descending speed of the bottom rail. In some circumstances, the bottom rail may even stop descending and the covering material cannot be fully expanded. Therefore, conventional cordless window coverings need to be improved with a control of the output of the damper to enable the covering material to expand fully and smoothly during the descending process of the bottom rail.

SUMMARY

In view of the above, the present disclosure provides a window covering control apparatus for controlling an expansion process of a window covering system and a window covering system having the same. During the descending process of the bottom rail, the window covering control apparatus may control damping output that is provided to the window covering system, thus a covering material of the window covering system may expand fully and smoothly.

In the present disclosure, a window covering control apparatus comprises a driving module, a damping output module, and a damping control module. The damping output module and the driving module are configured to operate simultaneously. The damping control module is coupled to the damping output module and the driving module, and the damping control module comprises a control detecting unit and a fitting unit. The control detecting unit comprises a detecting portion and a stopper portion. The detecting portion and the stopper portion are coupled to each other, and the detecting portion is configured to drive the stopper portion to move. The driving module is coupled to the detecting portion, and the detecting portion is driven to be displaced by the driving module. The fitting unit is coupled to the damping output module, and the stopper portion is configured to be detachably engaged to the fitting unit. During an expansion of the window covering system, the damping output module is driven by the driving module to provide damping to the driving module, and the driving module drives the detecting portion to move; when the stopper portion is driven apart by the detecting portion from the fitting unit, the driving module operates independently of the damping output module to stop the damping output module from providing damping.

In the present, a window covering system comprises a headrail, a bottom rail, a covering material and a window covering control apparatus. The covering material is arranged between the headrail and the bottom rail. The window covering control apparatus is arranged in the headrail. The window covering control apparatus comprises a driving module, a damping output module, and a damping control module. The driving module comprises a lifting cord. The lifting cord extends from the driving module toward the bottom rail, and the lifting cord is coupled to the bottom rail through the covering material. The damping output module and the driving module are configured to operate simultaneously. The damping control module is coupled to the damping output module and the driving module, and the damping control module comprises a control detecting unit and a fitting unit. The control detecting unit comprises a detecting portion and a stopper portion. The detecting portion and the stopper portion are coupled to each other, and the detecting portion is configured to drive the stopper portion to move. The driving module is coupled to the detecting portion, and the detecting portion is driven to be displaced by the driving module. The fitting unit is coupled to the damping output module, and the stopper portion is configured to be detachably engaged to the fitting unit. During an expansion of the covering material, the damping output module is driven by the driving module to provide damping to the driving module; when the bottom rail descends to a position, the stopper portion is driven apart by the detecting portion from the fitting unit, the driving module operates independently of the damping output module to stop the damping output module from providing damping.

Compared to conventional designs, the window covering control apparatus and the window covering system of the present disclosure may effectively control the expansion of the covering material and improve the smoothness of the expansion process using the window covering control apparatus.

BRIEF DESCRIPTION OF THE DRAWINGS

Reference is made to exemplary embodiments of the present disclosure, examples of which may be illustrated in the accompanying drawings.

DETAILED DESCRIPTION

Figure 1:
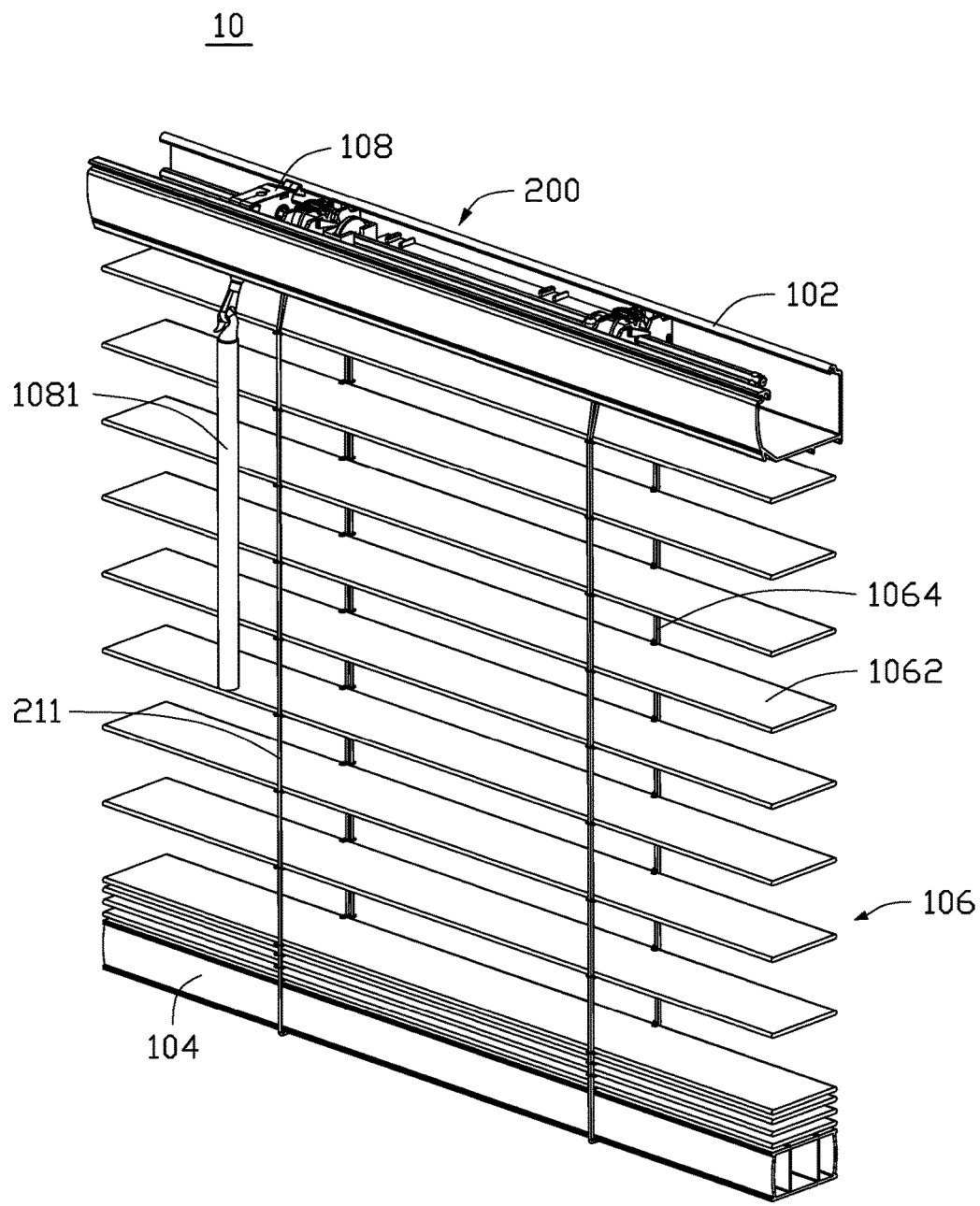
FIG. 1 is a perspective view of one exemplary embodiment of a window covering system of the present disclosure.

The present disclosure will now be described more fully hereinafter with reference to the accompanying drawings, in which exemplary embodiments of the disclosure are shown. This disclosure may, however, be embodied in many different forms and should not be construed as limited to the embodiments set forth herein. Rather, these embodiments are provided so that this disclosure will be thorough and complete, and will fully convey the scope of the disclosure to those skilled in the art. Like reference numerals refer to like elements throughout.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," or "includes" and/or "including" or "has" and/or "having" when used herein, specify the presence of stated features, regions, integers, steps, operations, elements, and/or components, but do not preclude the presence or addition of one or more other features, regions, integers, steps, operations, elements, components, and/or groups thereof.

It will be understood that the term "and/or" includes any and all combinations of one or more of the associated listed items. It will also be understood that, although the terms first, second, third etc. may be used herein to describe various elements, components, regions, parts and/or sections, these elements, components, regions, parts and/or sections should not be limited by these terms. These terms are only used to distinguish one element, component, region, part or section from another element, component, region, layer or section. Thus, a first element, component, region, part or section discussed below could be termed a second element, component, region, layer or section without departing from the teachings of the present disclosure.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

The description will be made as to the embodiments of the present disclosure in conjunction with the accompanying drawings in FIGS. 1 to 18. Reference will be made to the drawing figures to describe the present disclosure in detail, wherein depicted elements are not necessarily shown to scale and wherein like or similar elements are designated by same or similar reference numeral through the several views and same or similar terminology.

FIG. 1 shows one exemplary embodiment of a window covering system of the present disclosure. The window covering system 10 comprises a headrail 102, a bottom rail 104, a covering material 106, a tilting apparatus 108, and a window covering control apparatus 200. The covering material 106 is arranged between the headrail 102 and the bottom rail 104. The covering material 106 may be configured to different types in the window covering system 10 according to requirements of users, thus the window covering system 10 may be a blind, cellular shades, or a Roman shade, but is not limited thereto. In the following, a blind type of exemplary embodiment of the window covering system is used as examples to illustrate the present disclosure, but the scope of the disclosure is not limited thereto.

Figure 2:
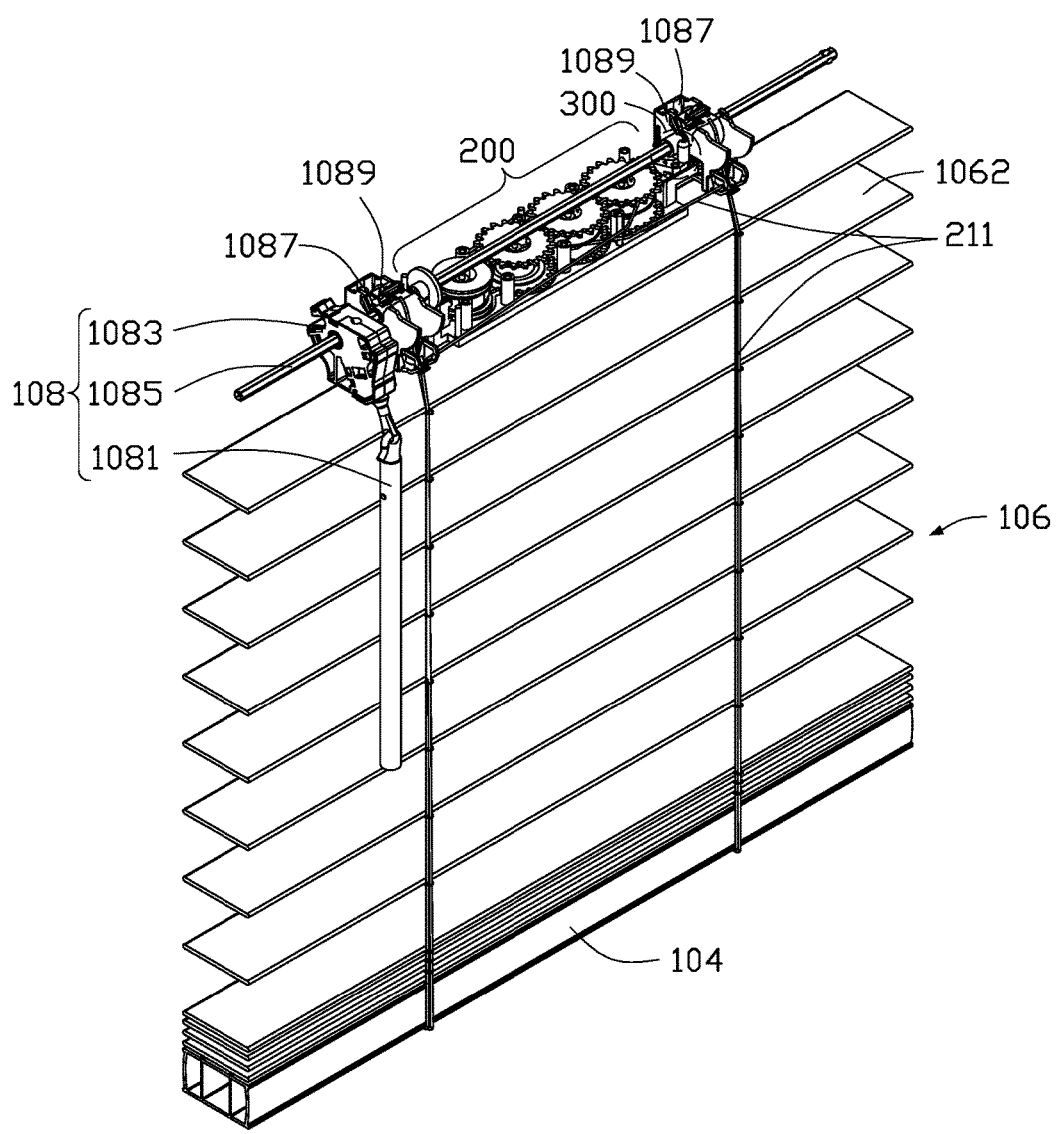
FIG. 2 is a perspective view of an internal structure of a headrail of the window covering system in FIG. 1.

FIG. 2 shows an internal structure of a headrail of the window covering system 10. The headrail 102 of the window covering system 10 is removed in FIG. 2 to show the tilting apparatus 108 and the window covering control apparatus 200 is arranged in the headrail 102. The tilting apparatus 108 comprises a rotating rod 1081, a turning unit 1083, a tilting shaft 1085, a drum 1087, and a drum support 1089. The turning unit 1083, the tilting shaft 1085, the drum 1087, and the drum support 1089 are located in the headrail 102. The drum 1087 is located on the drum support 1089. The drum 1087 is coaxial to the turning unit 1083, and the drum 1087 connects to the turning unit 1083 through the tilting shaft 1085. The rotating rod 1081 connects to the turning unit 1083. Upon rotating the rotating rod 1081, the turning unit 1083 is driven to actuate by the rotating rod 1081 while the drum 1087 is driven to swing back and forth by the turning unit 1083 through the tilting shaft 1085.

In the exemplary embodiment, the covering material 106 may have a plurality of slats 1062. When the covering material 106 is expanded and the plurality of slats 1062 is horizontal, each slat 1062 is spaced by at least one ladder 1064, as shown in FIG 1. One end of the ladder 1064 is mounted to the drum 1087; the other end of the ladder 1064 is mounted to the bottom rail 104. A user may adjust a tilting angle of the slats 1062 between the headrail 102 and the bottom rail 104 by manipulating the ladder 1064. Specifically, the user may adjust the tilting angle of the slats 1062 by manipulating the tilting apparatus 108 connected to the ladder 1064.

The window covering control apparatus 200 comprises at least one lifting cord 211. The lifting cord 211 extends from the window covering control apparatus 200 and connects to the bottom rail 104 through the slats 1062. During the expansion of the covering material 106, the bottom rail 104 descends according to a weight of the bottom rail 104 and the covering material 106 while the entire window covering control apparatus 200 is driven to actuate by the lifting cord 211. Moreover, the window covering system 10 may further comprise an unlocking apparatus 300. The unlocking apparatus 300 connects to the window covering control apparatus 200, and the unlocking apparatus 300 is configured to control the expansion of the covering material 106 and the retaining of the bottom rail 104. When the unlocking device 300 is locked, the bottom rail 104 and the covering material 106 are stationary. When the unlocking apparatus 300 is unlocked, the bottom rail 104 descends by the weight of the bottom rail 104 and the covering material 106 while the covering material 106 is driven to expand. In the exemplary embodiment shown in FIG. 2, the unlocking apparatus 300 is a combination of a tilting apparatus and an unlocking apparatus, and sleeves over the tilting shaft 1085. When the tilting shaft 1085 is rotating, the unlocking apparatus 300 is actuated by the tilting shaft 1085 to unlock the window covering control apparatus 200, thus the bottom rail 104 descends to expand the covering material 106. In other exemplary embodiments of the present disclosure, the unlocking apparatus 300 may also be a combination of a tilting apparatus and an unlocking apparatus driven by a cord, a cord unlocking apparatus, a push-rod unlocking apparatus, or a reverse-pulling loop unlocking apparatus, but is not limited thereto. The present disclosure may use any suitable unlocking apparatus.

Figure 3:
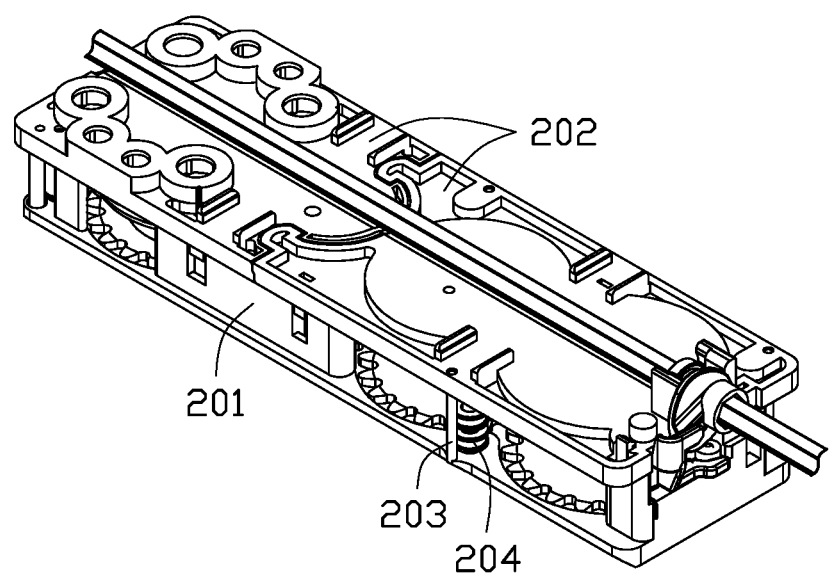
FIG. 3 is a perspective view of a first exemplary embodiment of a window covering control apparatus of the present disclosure.
Figure 4:
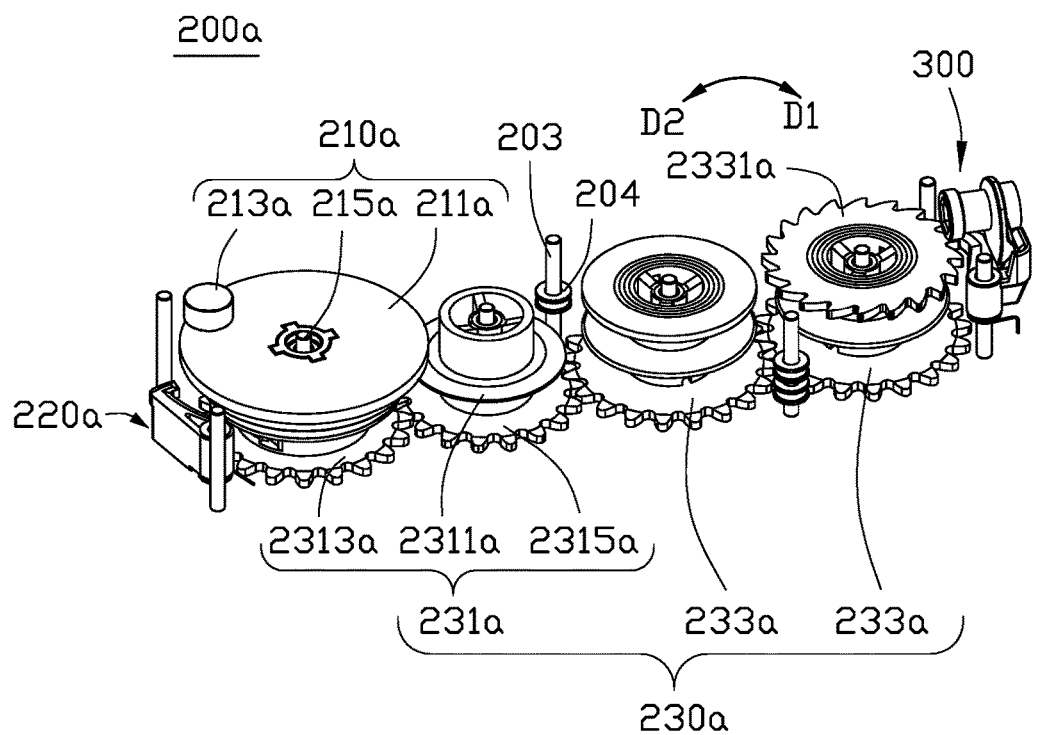
FIG. 4 is a perspective view of an internal structure of the window covering control apparatus in FIG. 3.

FIG. 3 shows a window covering control apparatus of the window covering system according to a first exemplary embodiment of the present disclosure, and FIG. 4 shows an internal structure of the window covering control apparatus in FIG. 3. The window covering control apparatus 200*a* comprises a casing base 201 and a casing cover 202. The casing base 201 and the casing cover 202 in FIG. 3 are removed in FIG. 4 to show internal components of the window covering control apparatus 200*a*. The window covering control apparatus 200*a* comprises a damping output module 210*a*, a damping control module 220*a*, and a driving module 230*a*. The damping output module 210*a* and the driving module 230*a* are configured to operate simultaneously. When the driving module 230*a* is actuated, the driving module 230*a* drives the damping output module 210*a* to actuate, thus the damping output module 210*a* provides damping to the driving module 230*a*.

In the present exemplary embodiment, the driving module 230*a* comprises a power assembly 231*a*, two spools 233*a*, and the lifting cord 211. The power assembly 231*a* and the spools 233*a* are configured to operate simultaneously, and the lifting cord 211 is wound around the spool 233*a*, as shown in FIG. 2. The unlocking apparatus 300 comprises a pawl (not labeled) corresponding to a ratchet 2331*a* of the spool 233*a*. When the pawl is engaged to the ratchet 2331*a*, the spool 233*a* cannot rotate toward a first direction D1, thus the bottom rail 104 and the covering material 106 are stationary. On the contrary, when the pawl is separated from the ratchet 2331*a*, the weight of the bottom rail 104 and the covering material 106 pulls the lifting cord 211 to rotate the spool 233*a* toward the first direction D1, thus driving the power assembly 231*a* to actuate. It should be noted that, when the pawl is engaged to the ratchet 2331*a*, the spool 233*a* may rotate toward a second direction D2, allowing the bottom rail 104 to ascend to collect the covering material 106.

The power assembly 231*a* comprises a spiral spring (not labeled), a storage wheel 2311*a*, and a drive wheel 2313*a*. The storage wheel 2311*a* and the drive wheel 2313*a* are configured to operate simultaneously. The spiral spring has two ends, one end is mounted to and wound around the storage wheel 2311*a*, and the other end is mounted to and wound around the drive wheel 2313*a*. During the expansion of the window covering system 10, the spiral spring is wound from the storage wheel 2311*a* to the drive wheel 2313*a*. Conversely, when collecting the window covering system 10, the spiral spring is wound from the drive wheel 2313*a* to the storage wheel 2311*a*. As shown in FIG. 4, the two spools 233*a* and the drive wheel 2313*a* may actuate each other by means of intermeshed gears. Specifically, when the bottom rail 104 is descending, the lifting cord 211 drives the spools 233*a* to rotate, also drives the drive wheel 2313*a* to rotate, and winds the spiral spring from the storage wheel 2311*a* to the drive wheel 2313*a*. At this time, elastic potential energy of the spiral spring is accumulated at the drive wheel 2313*a*. When the bottom rail 104 is ascending, the spiral spring releases the elastic energy and is wound from the drive wheel 2313*a* to the storage wheel 2311*a*, allowing the drive wheel 2313*a* to drive the spools 233*a* to rotate, and as a result, the lifting cord 211 is wound around the spools 233*a*. It should be noted that, in FIGS. 3 and 4, the window covering control apparatus 200*a* may further comprise at least one column 203 and at least one sheave 204. The column 203 is fixed between the casing base 201 and the casing cover 202. The sheave 204 is sleeved over the column 203. The lifting cord 211 may be wound around the spools 233*a* after bypassing the sheave 204 to prevent a direct friction between the lifting cord 211 and side walls of the casing base 201, which may break the lifting cord 211. Moreover, each lifting cord 211 may be wound around the spools 233*a* after being individually wound around one of the at least one sheave 204 to prevent entanglement of different lifting cords 211, which may cause inconvenience of operation of the lifting cords 211.

Figure 5:
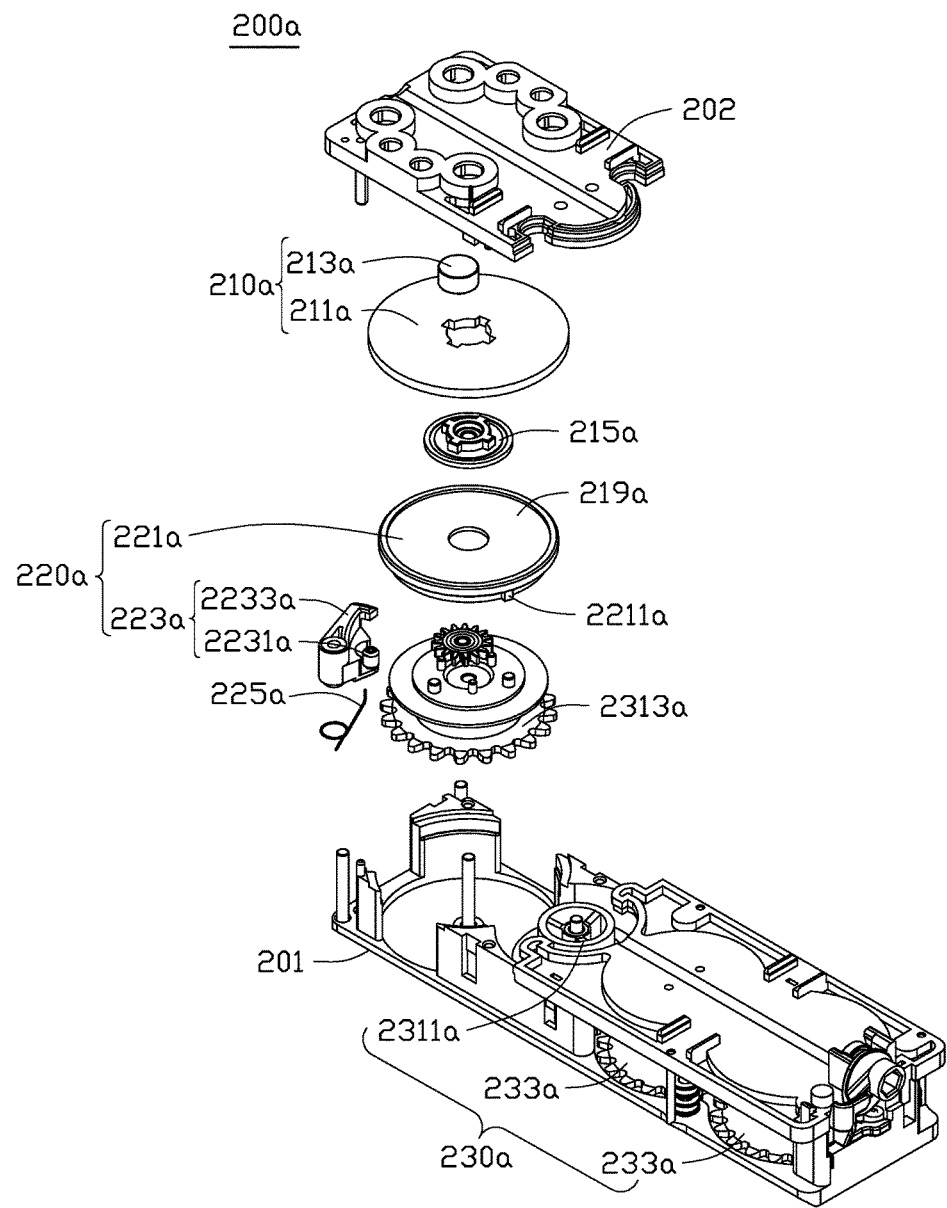
FIG. 5 is an exploded view of a damping output module and a damping control module of the window covering control apparatus in FIG. 3.
Figure 6:
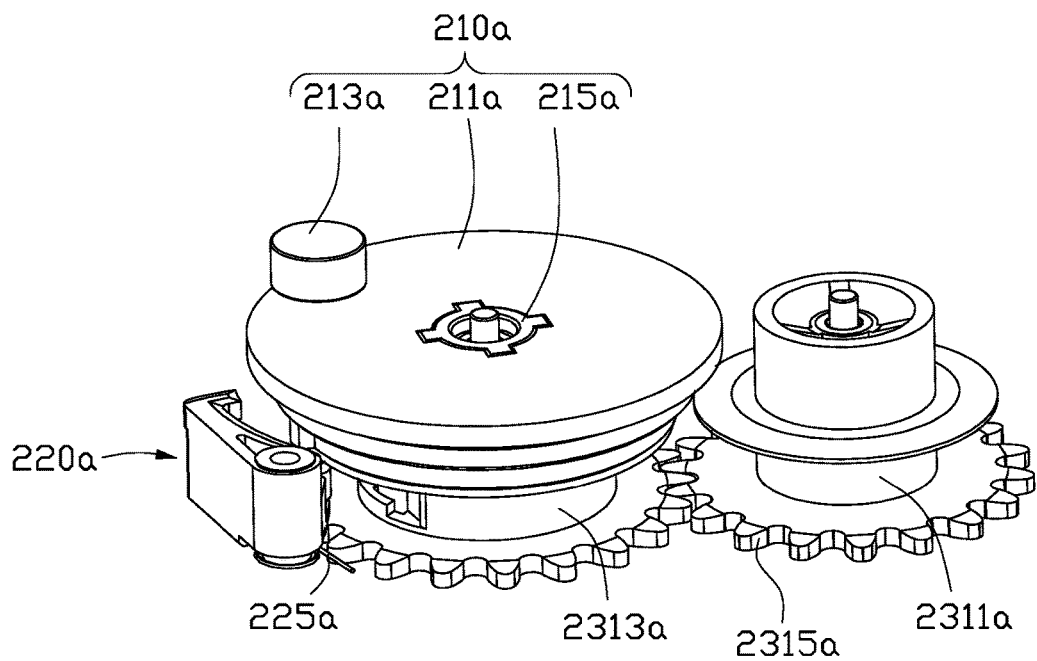
FIG. 6 is a perspective view of the damping output module, the damping control module, and a driving module of the window covering control apparatus in FIG. 3.

FIGS. 5-10 illustrate connections and simultaneous operation mechanisms of the damping output module 210*a*, the damping control module 220*a*, and the power assembly 231*a*. FIG. 5 is an exploded view of the damping output module 210*a* and the damping control module 220*a* of the window covering control apparatus in FIG. 3. The damping output module 210*a* comprises a first damping unit 211*a* and a second damping unit 213*a*. The first damping unit 211*a* and the driving module 230*a* are configured to operate simultaneously. The damping output module 210*a* comprises a rotatory shaft 215*a*. When the driving module 230*a* is actuated, the first damping unit 211*a* is driven by the driving module 230*a* to rotate axially about the rotatory shaft 215*a*. The damping output module 210*a* is located on the drive wheel 2313*a*, and the first damping unit 211*a* is coaxial to the drive wheel 2313*a*, as shown in FIG. 6.

The damping control module 220*a* is coupled to the damping output module 210*a* and the driving module 230*a*. The damping control module 220*a* comprises a fitting unit 221*a* and a control detecting unit 223*a*. The fitting unit 221*a* is arranged on the damping output module 210*a*. Specifically, the fitting unit 221*a* may connect to the first damping unit 211*a* or the second damping unit 213*a*. The control detecting unit 223a comprises a detecting portion 2231a and a stopper portion 2233a. The detecting portion 2231a and the stopper portion 2233a are coupled to each other, and the detecting portion 2231a drives the stopper portion 2233a to move. The detecting portion 2231a is coupled to the driving module 230a. When the driving module 230a is actuated, the detecting portion 2231a is driven to be displaced by the driving module 230a. During the expansion of the window covering system 10, when the driving module 230a is actuated and the fitting unit 221a is engaged to the stopper portion 2233a, the fitting unit 221a remains stationary, and the damping output module 210a provides damping to the driving module 230a. When the driving module 230a is actuated to drive the stopper portion 2233a apart from the fitting unit 221a, the driving module 230a operates independently of the damping output module 210a, and the damping output module 210a stops providing damping to the driving module 230a. The fitting unit 221a may further comprise at least one protruding block 2211a, as shown in FIG. 5. The protruding block 2211a may engage to the stopper portion 2233a, thus the fitting unit 221a remains stationary.

Figure 8:
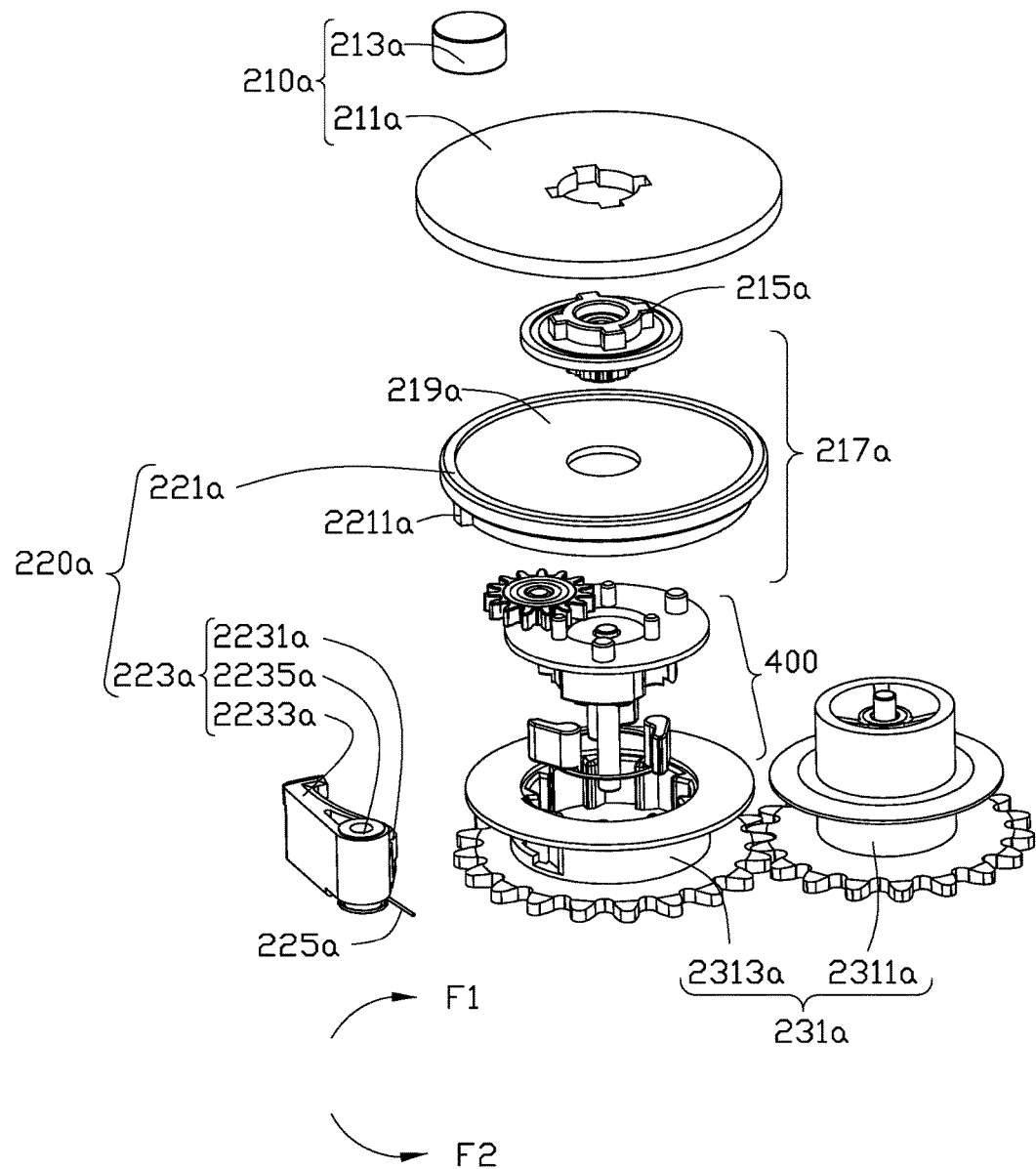
FIG. 8 is exploded view of the damping output module, the damping control module, and the driving module of the window covering control apparatus in FIG. 6.

The damping control module 220a may further comprise an elastic unit 225a. The elastic unit 225a is coupled to the control detecting unit 223a. The elastic unit 225a provides a first force to the detecting portion 2231a, wherein the first force acting on the detecting portion 2231a has a direction that is opposite to a direction of the detecting portion 2231a driven to be moved by the driving module 230a. In FIG. 8, the elastic unit 225a provides a first force F1 to the control detecting unit 223a. During the expansion of the window covering system 10, the driving module 230a provides a second force F2 to the control detecting unit 223a. The second force F2 has an opposite direction to a direction of the first force F1 as shown in FIG. 8. The control detecting unit 223a may further comprise a pivotal shaft 2235a. The stopper portion 2233a is driven by the first force F1 and the second force F2 to pivot about the pivotal shaft 2235a. The detecting portion 2231a and the stopper portion 2233a are located on a same side with respect to the pivotal shaft 2235a. The elastic unit 225a is placed around the pivotal shaft 2235a to provide the first force F1 to the control detecting unit 223a.

Figure 7:
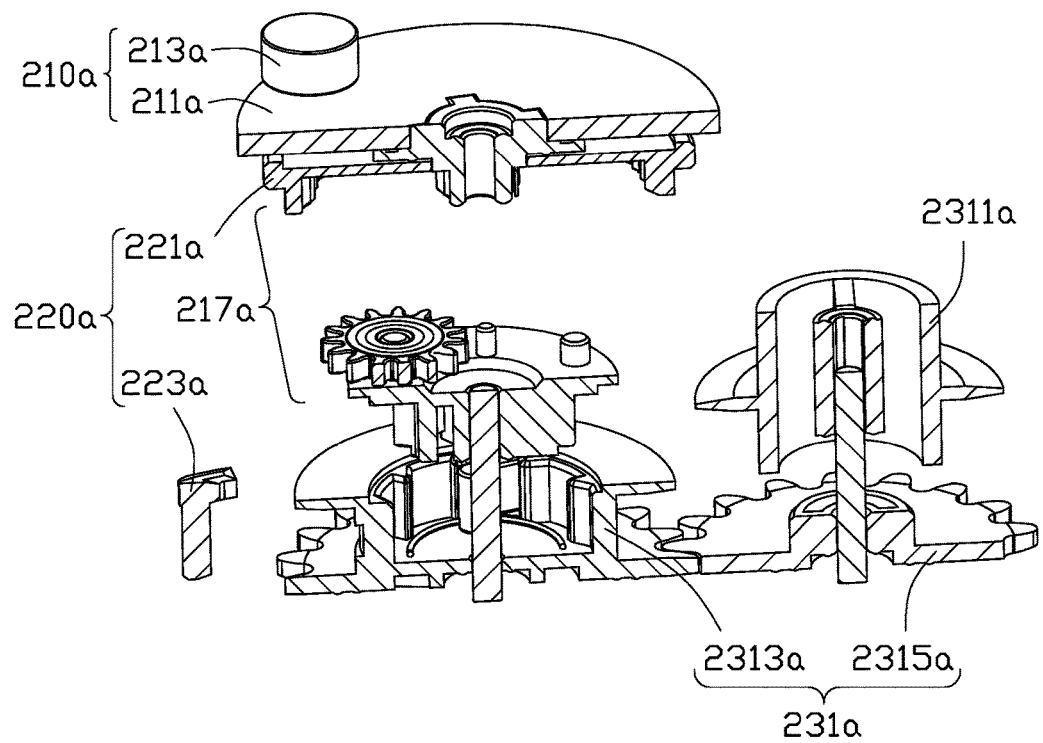
FIG. 7 is an exploded sectional view of the damping output module, the damping control module, and the driving module of the window covering control apparatus in FIG. 6.

When the driving module 230a is actuated and the fitting unit 221a is engaged to the stopper portion 2233a, the driving module 230a drives the first damping unit 211a to move relative to the second damping unit 213a. The damping output module 210a thus provides damping to the driving module 230a. Specifically, the fitting unit 221a of the damping control module 220a is coaxial to the first damping unit 211a of the damping output module 210a, as shown in FIG. 7. When the driving module 230a is actuated and the fitting unit 221a is engaged to the stopper portion 2233a, the driving module 230a drives the first damping unit 211a to rotate relative to the second damping unit 213a while the fitting unit 221a remains stationary. When the driving module 230a is actuated continuously and the stopper portion 2233a is driven apart from the fitting unit 221a, the fitting unit 221a rotates synchronously with the damping output module 210a, but the driving module 230a operates independently of the damping output module 210a. That is, when the driving module 230a is actuated continuously and the stopper portion 2233a is driven apart from the fitting unit 221a, the fitting unit 221a rotates with the drive wheel 2313a synchronously, but the drive wheel 2313a operates independently of the first damping unit 211a of the damping output module 210a.

Referring to FIG. 8, the damping output module 210a comprises a housing 219a and the housing 219a is substantially cylindrical. The fitting unit 221a is formed around an outer surface of the housing 219a. The fitting unit 221a, the first damping unit 211a, and the housing 219a are coaxial. Furthermore, the fitting unit 221a may be integrally formed with the housing 219a. When the fitting unit 221a is separated from the stopper portion 2233a and the driving module 230a is actuated, the fitting unit 221a and the housing 219a rotate synchronously with the driving module 230a while the first damping unit 211a and the second damping unit 213a remain stationary.

Figure 9:
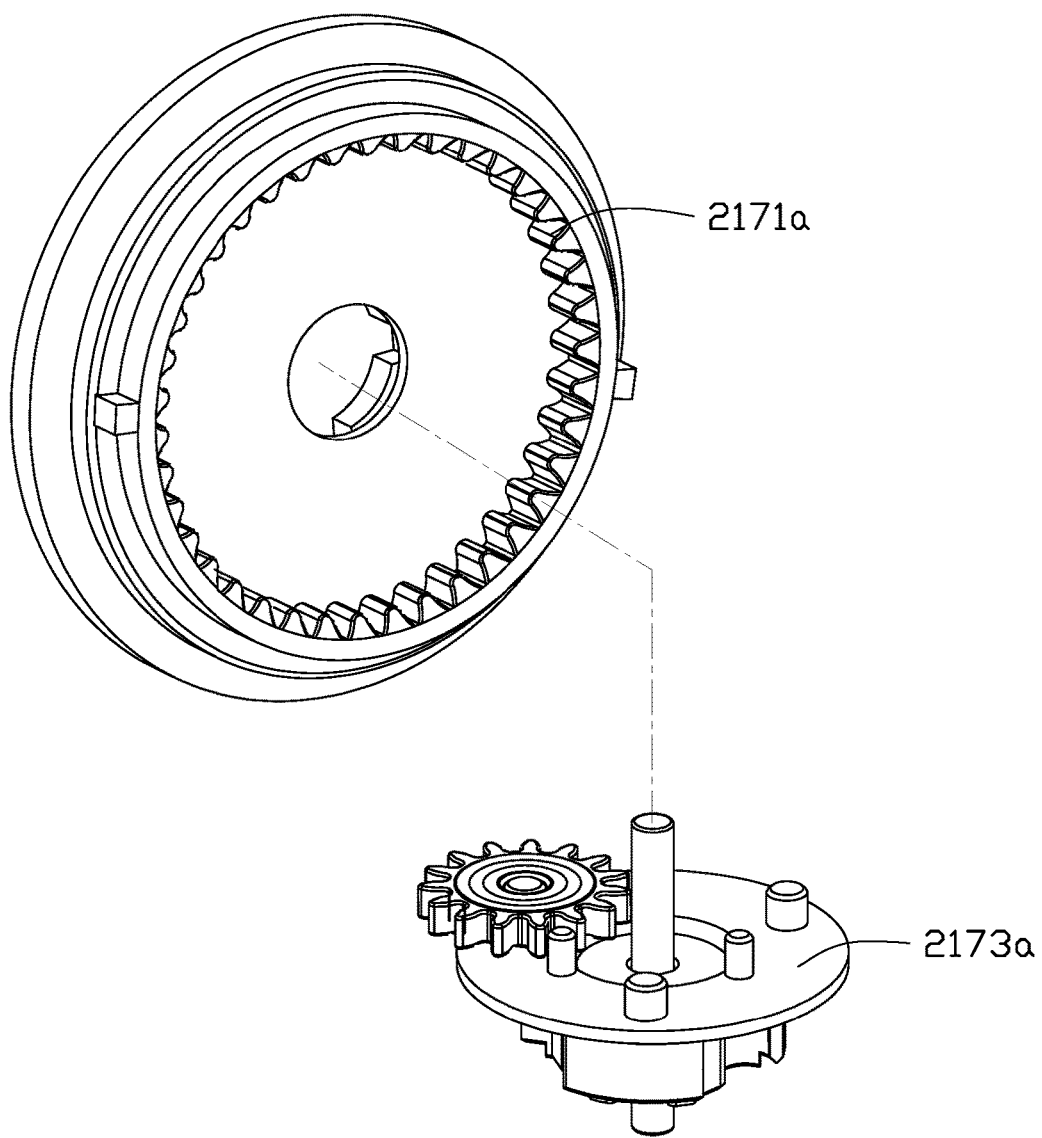
FIG. 9 and FIG. 10 are exploded views of a transmission of the window covering control apparatus in FIG. 8.
Figure 10:
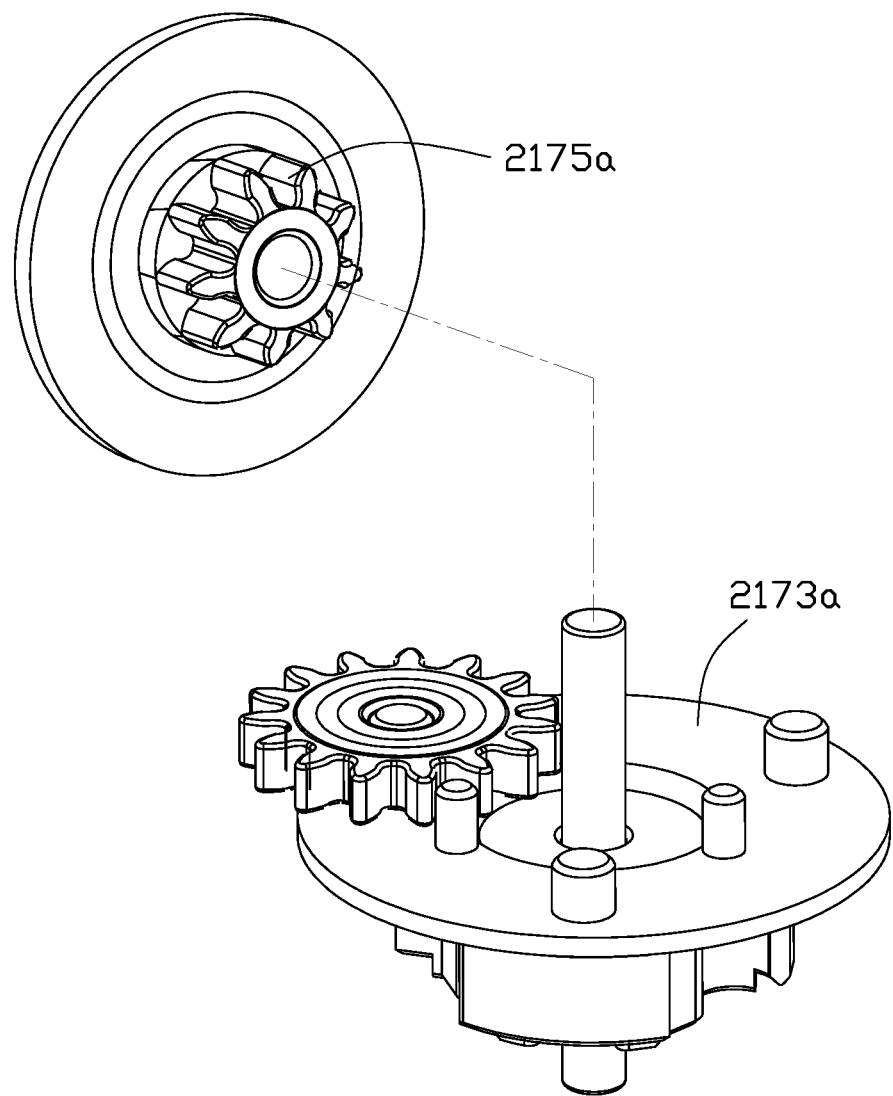

The damping output module 210a may further comprise a transmission 217a. The transmission 217a is arranged inside the housing 219a. The first damping unit 211a is located between the transmission 217a and the second damping unit 213a, as shown in FIG. 7. The transmission 217a may be a planetary gear transmission. FIG. 9 and FIG 10 are exploded views of the transmission of the window covering control apparatus in FIG. 8. The housing 219a has an inner surface, and an annular gear 2171a is defined on the inner surface of the housing 219a. The transmission 217a has a planetary gear carrier 2173a. The annular gear 2171a and the planetary gear carrier 2173a are engaged to each other. The transmission 217a may further comprise a sun gear 2175a. The sun gear 2175a is coaxial to the first damping unit 211a. When the driving module 230a is actuated and the stopper portion 2233a is engaged to the fitting unit 221a, the sun gear 2175a is driven by the driving module 230a to rotate axially about the rotatory shaft 215a, and the first damping unit 211a is driven to rotate by the sun gear 2175a. Upon continuous operation of the driving module 230a, the stopper portion 2233a is driven apart from the fitting unit 221a, and the fitting unit 221a and the housing 219a rotate synchronously with the driving module 230a. At this point, according to a retarding force between the first damping unit 211a and the second damping unit 213a, the sun gear 2175a is stopped, thus the driving module 230 operates independently of the damping output module 210a.

Figure 11:
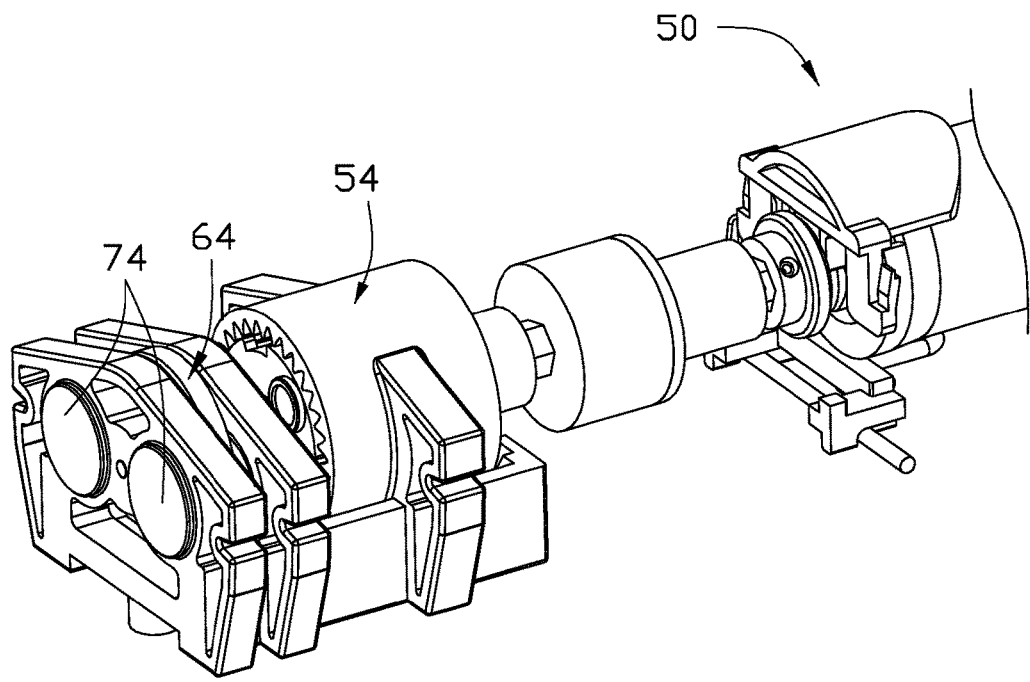
FIG. 11 and FIG. 12 are perspective views of exemplary embodiments presented in FIG. 8 and FIG. 9 of U.S. patent application Ser. No. 15/159,309.
Figure 12:
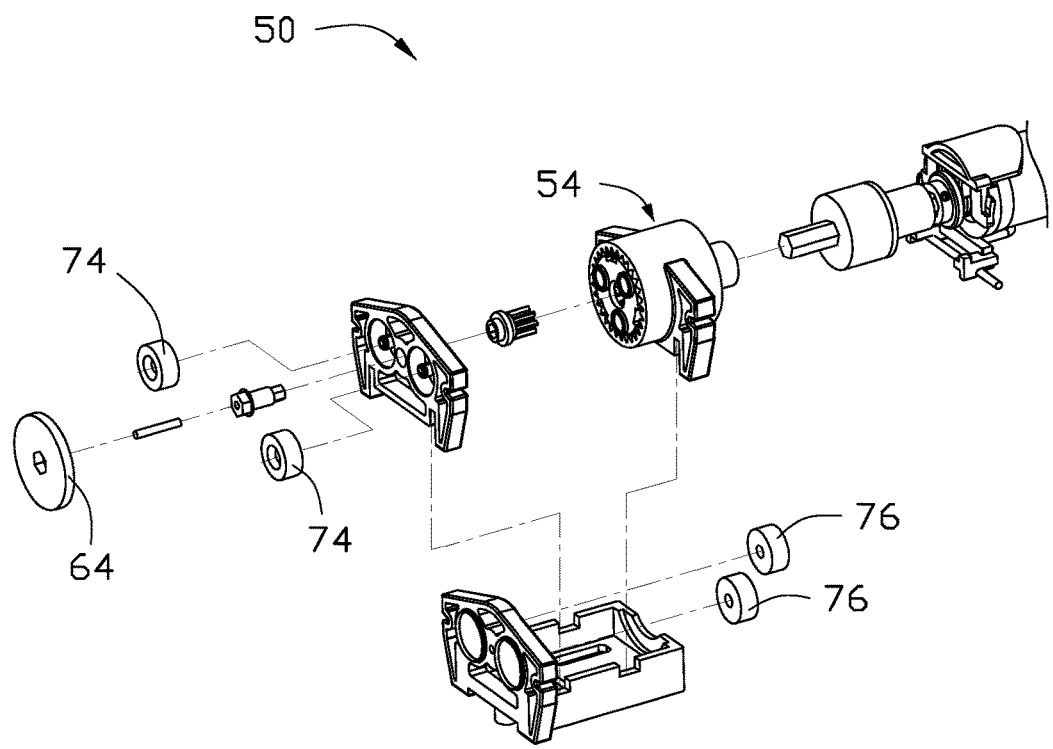
Figure 13:
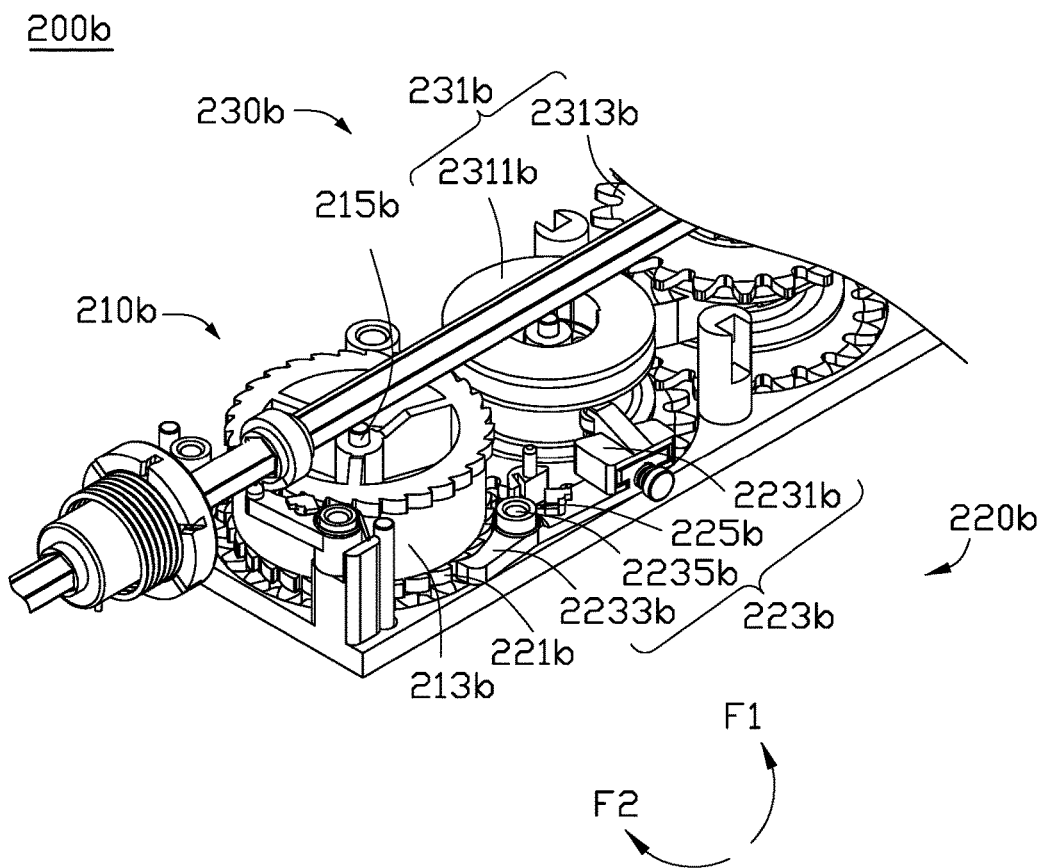
FIG. 13 is a perspective view of a second exemplary embodiment of a window covering control apparatus of the present disclosure.

In the present exemplary embodiment, the damping output module 210a may be a magnetic damping output module, wherein the first damping unit 211a is an aluminum disk and the second damping unit 213a is a magnet. As the aluminum disk moves relative to the magnet, an electromagnetic induction force is generated, thus the magnetic damping output module may output damping to the driving module 230a. FIG. 11 and FIG. 12 are drawings of U.S. patent application Ser. No. 15/159,309, which discloses a damping apparatus 50 including a gearbox 54 being a transmission, a disk 64, and magnets 74, 76, wherein the disk 64 and the magnets 74, 76 form a magnetic damping output module. The relative positions and the simultaneous operation mechanism of the transmission 217a, that is, the first damping unit 211a and the second damping unit 213a according to one embodiment of the present disclosure are similar to the relative positions and the simultaneous operation mechanism of the gearbox 54, the disk 64, and the magnets 74, 76, and are thus not described in detail.

In the present exemplary embodiment, when the driving module 230a is continuously actuated and drives the damping control module 220 to actuate, the damping control module 220a may stop the damping output module 210a, which stops the damping output module 210a from continuing to provide damping to the driving module 230a. It should be noted that the damping control module 220a may stop the damping output module 210a by stopping the relative movement between the first damping unit 211a and the second damping unit 213a. In the present exemplary embodiment, upon continuous operation of the driving module 230a, the stopper portion 2233a is driven apart from the fitting unit 221a, according to the retarding force between the aluminum disc and the magnet, the sun gear 2175a stops rotating. The aluminum disc and the magnet of the damping output module 210a are thus stationary, and the damping output module 210a no longer provides damping to the driving module 230a and the driving module 230a actuates independently of the damping output module 210a. However, in other exemplary embodiments of the present disclosure, upon continuous operation of the driving module 230a, the stopper portion 2233a is driven apart from the fitting unit 221a, the generation of electromagnetic induction force between the aluminum disc and the magnet may be stopped by removing the magnet or demagnetizing the magnet, thus the damping output module 210a no longer provides damping to the driving module 230a and the driving module 230a actuates independently of the damping output module 210a.

It should be noted that the damping output module 210a of the present exemplary embodiment shown in FIGS. 3-10 is described as having a magnetic damping. This should not be considered a limitation of implementation modes of the damping output module 210a. In other embodiments of the present disclosure, the damping output module 210a may use other damping types, such as friction damping, oil damping, or electrostatic damping. Multiple types of damping output modules may also be applied in one damping adjusting assembly to optimize the damping effect provided by the damping adjusting assembly to the window covering system.

Referring to FIGS. 6-7, showing the simultaneous operation mechanism of the driving module 230a, the storage wheel 2311a of power assembly 231a is separated from a gear 2315a below the storage wheel 2311a, that is, the gear 2315a and the storage wheel 2311a are not configured to operate simultaneously. The spools 233a are configured to operate simultaneously to the drive wheel 2313a through the gear 2315a below the storage wheel 2311a. When the bottom rail 104 is descending, the spools 233a are rotated and configured to operate simultaneously to the drive wheel 2313a through the gear 2315a while the storage wheel 2311a is not configured to operate simultaneously with the gear 2315a.

Moreover, the detecting portion 2231a of the control detecting unit 223a abuts the spiral spring that is wound around the drive wheel 2313a. The spiral spring wound around the drive wheel 2313a has a diameter. The second force F2 is a resisting force generated by a change in the diameter of the spiral spring being wound around the drive wheel 2313a. The first force F1 drives the stopper portion 2233a to engage to the fitting unit 221a. During the expansion of the window covering system 10, the spiral spring is wound from the storage wheel 2311a to the drive wheel 2313a, thus the elastic energy of the spiral spring is accumulated at the drive wheel 2313a, and the diameter of the spiral spring being wound at the drive wheel 2313a increases. At this time, the resisting force pushes the detecting portion 2231a in a direction away from the axis of the drive wheel 2313a while the stopper portion 2233a is driven apart by the detecting portion 2231a from the fitting unit 221a. When the window covering system 10 is expanded to a specific position, the resisting force enables the detecting portion 2231a to drive the stopper portion 2233a apart from the fitting unit 221a, thus the fitting unit 221a and at least a part of the damping output module 210a are configured to operate simultaneously. The driving module 230a operates independently of the damping output module 210a. Specifically, when the window covering system 10 is continuously expanded to a specific position, the resisting force enables the detecting portion 2231a to drive the stopper portion 2233a apart from the fitting unit 221a, thus the fitting unit 221a rotates synchronously with the drive wheel 2313a of the power assembly 231a. The drive wheel 2313a thus operates independently of the first damping unit 211a of the damping output module 210a. The fitting unit 221a, the damping output module 210a, and the drive wheel 2313a are coaxial.

The window covering system 10 may further include a unidirectional controller 400, as shown in FIG. 8. The unidirectional controller 400 is coupled to the driving module 230a and the damping output module 210a, and the unidirectional controller 400 is arranged between the driving module 230a and the damping output module 210a. When the bottom rail 104 is descending, the driving module 230a drives the unidirectional controller 400 to rotate toward the first direction D1 and actuates the damping output module 210a, damping is thus provided by the damping output module 210a to the driving module 230a. When the bottom rail 104 is ascending, the driving module 230a rotates toward a second direction D2 that is opposite to the first direction D1 while the unidirectional controller 400 enables the driving module 230a to rotate toward the second direction D2 independently of the damping output module 210a. In the present disclosure, the unidirectional controller 400 may be a roller clutch, a spring clutch, a track-type clutch, a friction clutch, a ratchet clutch, or any other equivalent unidirectional controller. As the unidirectional controller 400 is only a standard configuration in any embodiment of the present disclosure and is not a subject of the present disclosure, the unidirectional controller 400 is not described further in detail.

Referring to FIGS. 13-16, FIG. 13 is a perspective view of a second exemplary embodiment of the window covering control apparatus of the present disclosure. The window covering control apparatus 200b comprises a damping output module 210b, a damping control module 220b, and a driving module 230b. The damping output module 210b and the driving module 230b are configured to operate simultaneously. When the driving module 230b is actuated, the damping output module 210b is driven to actuate by the driving module 230a, thus the damping output module 210b provides damping to the driving module 230b.

Figure 14:
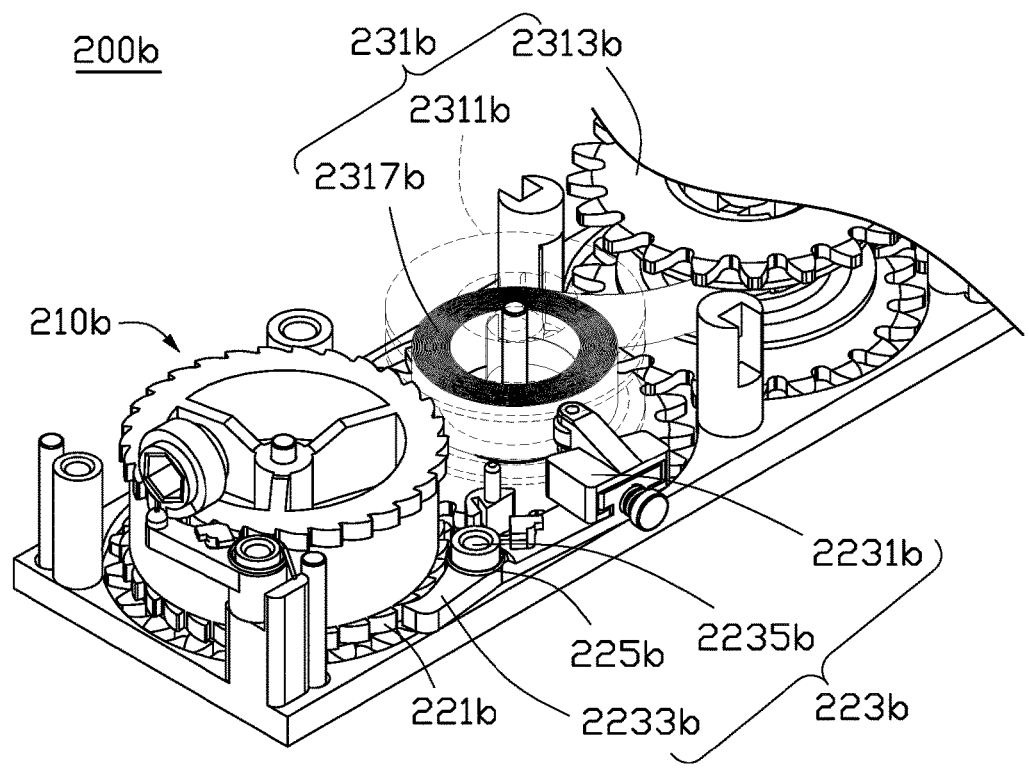
FIG. 14 is another perspective view of the window covering control apparatus in FIG. 13.
Figure 15:
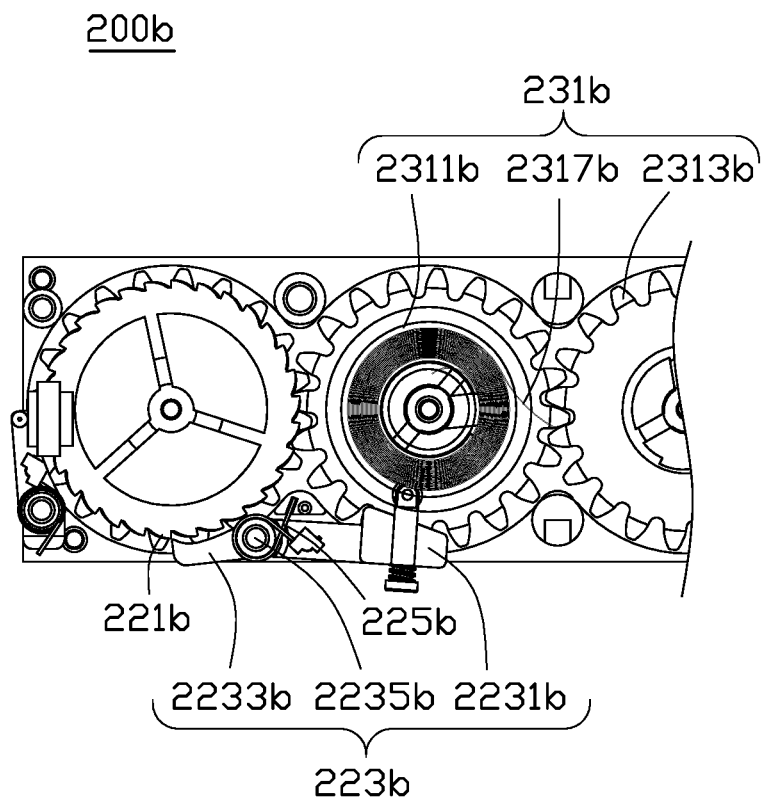
FIG. 15 is a top view of the window covering control apparatus in FIG. 13.
Figure 16:
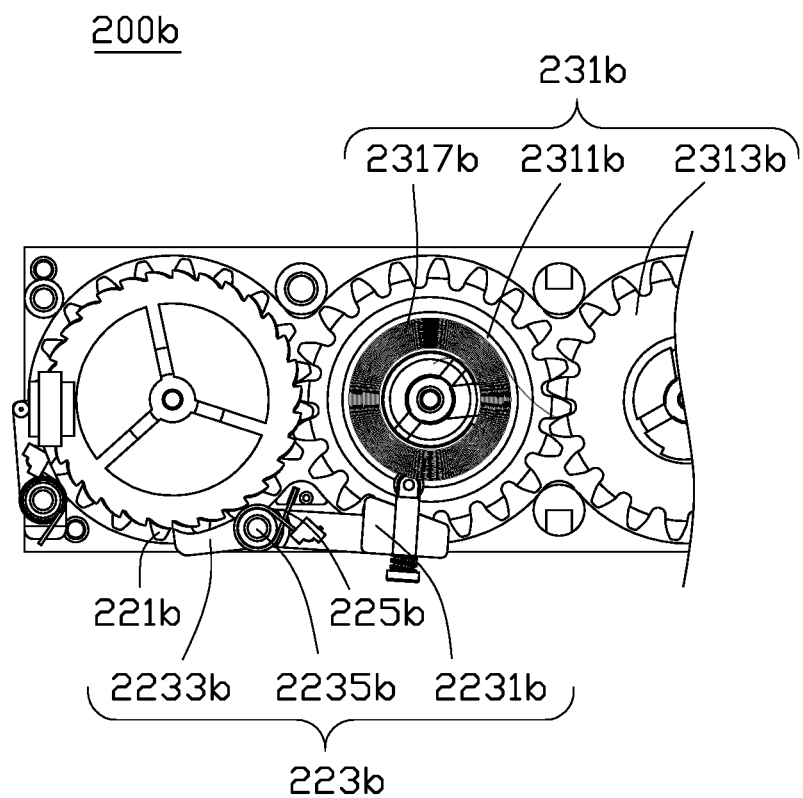
FIG. 16 is a schematic view of the operation of the window covering control apparatus in FIG. 15.

The driving module 230b comprises a power assembly 231b, a spool (not labeled), and a lifting cord 211 (as shown in FIG. 2). The power assembly 231b and the spool are configured to operate simultaneously, and the lifting cord 211 is wound around the spool. The power assembly 231b comprises a spiral spring 2317b, a storage wheel 2311b, and a drive wheel 2313b, as shown in FIG. 14. The storage wheel 2311b and the drive wheel 2313b are configured to operate simultaneously. The spiral spring 2317b has two ends, one end is mounted to and wound around the storage wheel 2311b, and the other end is mounted to and wound around the drive wheel 2313b. During the expansion of the window covering system 10, the spiral spring 2317b is wound from the storage wheel 2311b to the drive wheel 2313b. Conversely, when collecting the window covering system 10, the spiral spring 2317b is wound from the drive wheel 2313b to the storage wheel 2311b. Specifically, when the bottom rail 104 is descending, the lifting cord 211 drives the spool to rotate, and also drives the drive wheel 2313b to rotate, allowing the spiral spring 2317b to wind from the storage wheel 2311b to the drive wheel 2313b. At this time, elastic energy of the spiral spring 2317b is accumulated at the drive wheel 2313b. When the bottom rail is ascending, the spiral spring 2317b releases the elastic energy and is wound from the drive wheel 2313b to the storage wheel 2311b, allowing the drive wheel 2313b to drive the spool to rotate, and resulting in the lifting cord 211 being wound around the spool.

The damping output module 210b comprises a first damping unit (not labeled) and a second damping unit 213b. The first damping unit and the driving module 230b are configured to operate simultaneously. The damping output module 210b comprises a rotatory shaft 215b. When the driving module 230b is actuated, the first damping unit is driven by the driving module 230b to rotate axially about the rotatory shaft 215b. In the window covering control apparatus 200b, the damping output module 210b adjoins the storage wheel 2311b.

As shown in FIGS. 13-16, the damping control module 220b is coupled to the damping output module 210b and the driving module 230b. The damping control module 220b comprises a fitting unit 221b and a control detecting unit 223b. The fitting unit 221b is mounted on the damping output module 210b. Specifically, the fitting unit may connect to the first damping unit or the second damping unit 213b. The control detecting unit 223b comprises a detecting portion 2231b and a stopper portion 2233b. The detecting portion 2231b and the stopper portion 2233b are coupled to each other, and the detecting portion 2231b may drive the stopper portion 2233b to move. The detecting portion 2231b is coupled to the driving module 230b. When the driving module 230b is actuated, the detecting portion 2231b is driven to be displaced by the driving module 230b. During the expansion of the window covering system 10, when the driving module 230b is actuated and the stopper portion 2233b is engaged to the fitting unit 221b, the fitting unit 221b remains stationary, and the damping output module 210b provides damping to the driving module 230b. When the driving module 230b is actuated and drives the stopper portion 2233b apart from the fitting unit 221b, the driving module 230b operates independently of the damping output module 210b.

The damping control module 220b may further comprise an elastic unit 225b. The elastic unit 225b is coupled to the control detecting unit 223b. The elastic unit 225b provides a first force F1 to the control detecting unit 223b. During the expansion of the window covering system 10, the driving module 230b provides a second force F2 to the control detecting unit 223b. The second force F2 has an opposite direction to a direction of the first force F1. The control detecting unit 223b may further comprise a pivotal shaft 2235b. The stopper portion 2233b is driven by the first force F1 and the second force F2 to pivot about the pivotal shaft 2235b. The detecting portion 2231b and the stopper portion 2233b are located on different sides relative to the pivotal shaft 2235b. The elastic unit 225b is placed around the pivotal shaft 2235b to provide the first force F1 to the control detecting unit 223b.

When the driving module 230b is actuated and the stopper portion 2233b is engaged to the fitting unit 221b, the driving module 230b drives the first damping unit to move relative to the second damping unit 213b. The damping output module 210b thus provides damping to the driving module 230b. Specifically, the fitting unit 221b is coupled to the second damping unit 213b. The fitting unit 221b of the damping control module 220b, and the first damping unit, and the second damping unit 213b of the damping output module 210b are coaxial. When the driving module 230b is actuated and the stopper portion 2233b is engaged to the fitting unit 221b, the driving module 230b drives the first damping unit to rotate relative to the second damping unit 213b while the fitting unit 221b remains stationary. When the driving module 230b is continuously actuated and drives the stopper portion 2233b apart from the fitting unit 221b, the fitting unit 221b rotates synchronously with the damping output module 210b, but the driving module 230b operates independently of the damping output module 210b. That is, when the driving module 230b is actuated continuously and the stopper portion 2233b is driven apart from the fitting unit 221b, the fitting unit 221b rotates synchronously with the drive wheel 2313b of the power assembly 231b, but the drive wheel 2313b operates independently of the first damping unit of the damping output module 210b. The fitting unit 221b is formed around an outer surface of the second damping unit 213b of the damping output module 210b. The fitting unit 221b, the first damping unit, and the second damping unit 213b are coaxial. The fitting unit 221b may be integrally formed with the second damping unit 213b.

It should be noted that when the driving module 230b is actuated continuously and the stopper portion 2233b is driven apart from the fitting unit 221b, the driving module 230b drives the first damping unit, the second damping unit 213b, and the fitting unit 221b to rotate synchronously, thus the damping output module 210b no longer provides damping to the driving module 230b. Specifically, when the driving module 230b is actuated continuously and the damping control module 220b is actuated, the damping control module 220b drives the first damping unit and the second damping unit 213b of the damping output module 210b to rotate synchronously. At this time, interactions between the first damping unit and the second damping unit 213b disappear, thus the damping output module 210b no longer provides damping to the driving module 230b, and the driving module 230b operates independently of the damper output module 210b. In other exemplary embodiments of the present disclosure, when the driving module 230b is actuated continuously and the damping control module 220b is actuated, the damping control module 220b may drive the first damping unit and the second damping unit 213b of the damping output module 210b to stop rotating. At this time, interactions between the first damping unit and the second damping unit 213b disappear, thus the damping output module 210b no longer provides damping to the driving module 230b, and the driving module 230b operates independently of the damper output module 210b.

In the present exemplary embodiment, the damping output module 210b is an oil damping output module. A fluid is arranged between the first damping unit and the second damping unit 213b. The fluid may be air, water, or grease, but is not limited thereto. By a relative movement between the first damping unit and the second damping unit 213b, a fluid resistance is caused by the fluid to the first damping unit and the second damping unit 213b, thereby providing damping to the driving module 230b. It should be noted that the oil damping is described only as an example of the damping output module 210b, which should not be considered as a limitation of the implementation modes of the damping output module 210b. In other exemplary embodiments of the present disclosure, the damping output module 210b may use other damping types, such as friction damping, magnetic damping, or electrostatic damping. Multiple types of damping output modules may also be applied in one damping adjusting assembly, to optimize the damping effect provided by the damping adjusting assembly to the window covering system.

Moreover, the detecting portion 2231b of the control detecting unit 223b abuts the spiral spring 2317b that is wound around the storage wheel 2311b. The spiral spring being wound around the storage wheel 2311b has a diameter. The second force F2 is a resisting force (not labeled) generated by a change in the diameter of the spiral spring 2317b being wound around the storage wheel 2311b. The resisting force pushes the stopper portion 2233b to engage to the fitting unit 221b. During the expansion of the window covering system 10, the diameter of the spiral spring 2317b being wound around the storage wheel 2311b decreases, and the detecting portion 2231b is driven by the first force F1 to move toward the axis of the storage wheel 2311b. The detecting portion 2231b thus drives the stopper portion 2233b apart from the fitting unit 221b. When the window covering system 10 is expanded to a specific position, the first force F1 enables the detecting portion 2231b to drive the stopper portion 2233b apart from the fitting unit 221b, thus the fitting unit 221b and at least a part of the damping output module are configured to operate simultaneously. Thus the driving module 230b operates independently of the damping output module 210b. Specifically, when the window covering system 10 is expanded to a specific position, the first force F1 enables the detecting portion 2231b to drive the stopper portion 2233b apart from the fitting unit 221b. The fitting unit 221b thus rotates synchronously with the first damping unit and the second damping unit 213b, but the drive wheel 2313b operates independently of the first damping unit of the damping output module 210b.

The window covering system 10 may further comprise an accelerator (not shown). The accelerator, the driving module 230b, and the damping output module 210b are configured to operate simultaneously. The accelerator is arranged between the driving module 230b and the damping output module 210b. The accelerator, not being a necessary component of the present disclosure, has been described in the previous exemplary embodiment, which is not described herein. The window covering system 10 may further comprise a unidirectional controller (not shown). The unidirectional controller is connected to the driving module 230b and the damping output module 210b, and the unidirectional controller is arranged between the driving module 230b and the damping output module 210b. The unidirectional controller, not being a necessary component of the present disclosure, has been described in the previous exemplary embodiment, thus is not described herein.

Figure 17:
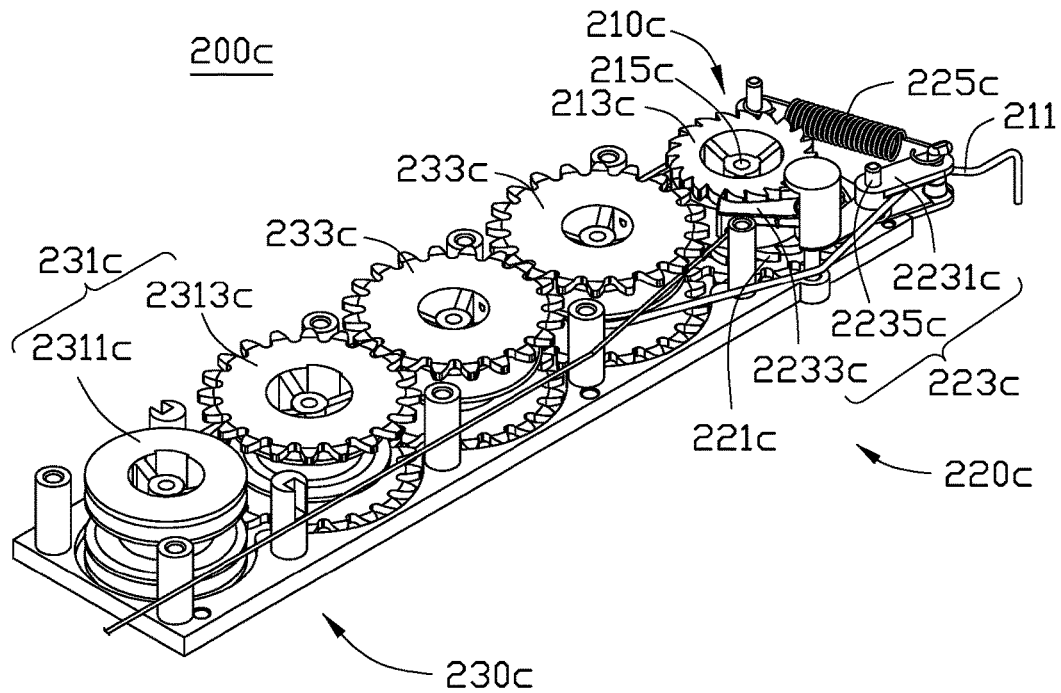
FIG. 17 is a perspective view of a third exemplary embodiment of the window covering control apparatus of the present disclosure.
Figure 18:
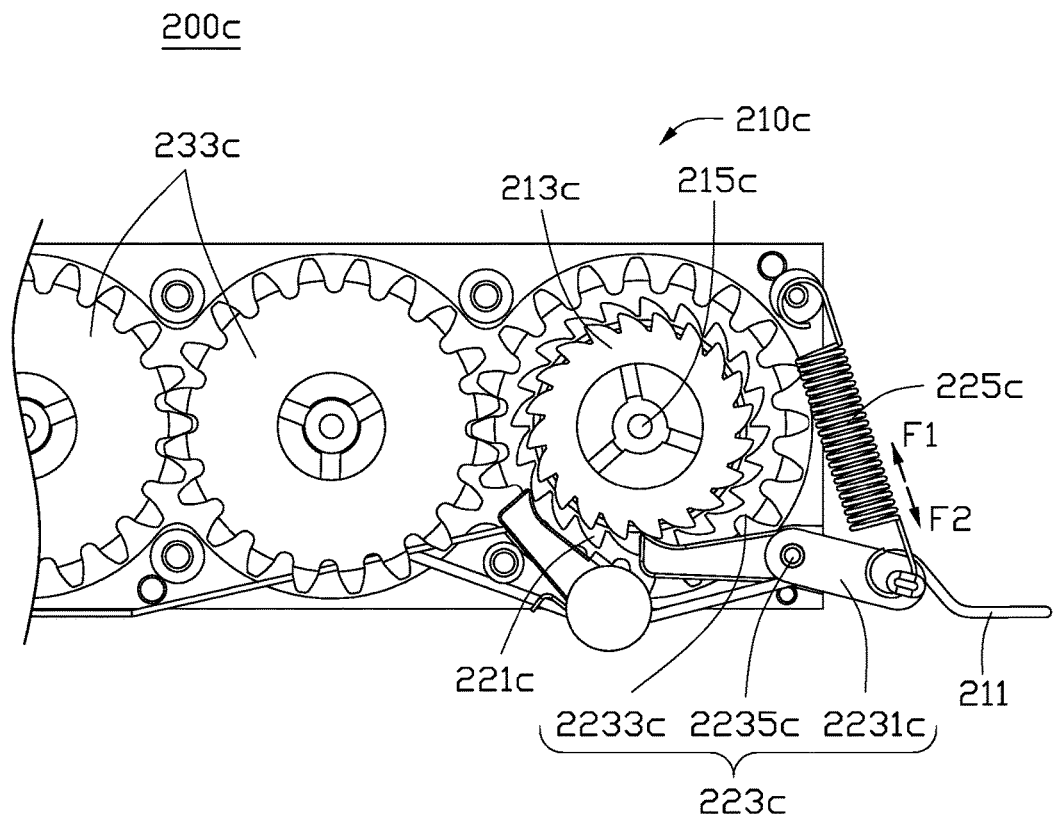
FIG. 18 is a top view of the window covering control apparatus in FIG. 17.

Referring to FIGS. 17-18, FIG. 17 is a perspective view of a third exemplary embodiment of the window covering control apparatus of the present disclosure, and FIG. 18 is a top view of the window covering control apparatus in FIG. 17. The window covering control apparatus 200c comprises a damping output module 210c, a damping control module 220c, and a driving module 230c. The damping output module 210c and the driving module 230c are configured to operate simultaneously. When the driving module 230c is actuated, the damping output module 210c is driven to actuate by the driving module 230c, thus the damping output module 210c provides damping to the driving module 230c.

The driving module 230c comprises a power assembly 231c, a spool 233c, and at least one lifting cord 211. The power assembly 231c and the spool 233c are configured to operate simultaneously, and the lifting cord 211 is wound around the spool 233c. The power assembly 231c comprises a spiral spring (not labeled), a storage wheel 2311c, and a drive wheel 2313c. The storage wheel 2311c and the drive wheel 2313c are configured to operate simultaneously. The spiral spring has two ends, one end is mounted to and wound around the storage wheel 2311c, and the other end is mounted to and wound around the drive wheel 2313c. During the expansion of the window covering system 10, the spiral spring is wound from the storage wheel 2311c to the drive wheel 2313c. Conversely, when collecting the window covering system 10, the spiral spring is wound from the drive wheel 2313c to the storage wheel 2311c. Specifically, when the bottom rail 104 is descending, the lifting cord 211 drives the spool 233c to rotate, and also drives the drive wheel 2313c to rotate, allowing the spiral spring to wind from the storage wheel 2311c to the drive wheel 2313c. At this time, elastic energy of the spiral spring is accumulated at the drive wheel 2313c. When the bottom rail is ascending, the spiral spring releases the elastic energy and is wound from the drive wheel 2313c to the storage wheel 2311c, allowing the drive wheel 2313c to drive the spool 233c to rotate, and so winding the lifting cord 211 around the spool 233c.

The damping output module 210c comprises a first damping unit (not labeled) and a second damping unit 213c. The first damping unit and the driving module 230c are configured to operate simultaneously. The damping output module 210c comprises a rotatory shaft 215c. When the driving module 230c is actuated, the first damping unit 211c is driven by the driving module 230c to rotate axially about the rotatory shaft 215c. In the window covering control apparatus 200c, the damping output module 210c adjoins the spool 233c.

The damping control module 220c is coupled to the damping output module 210c and the driving module 230c. The damping control module 220c comprises a fitting unit 221c and a control detecting unit 223c. The fitting unit 221c is mounted on the damping output module 210c. Specifically, the fitting unit 221a may connect to the first damping unit or the second damping unit 213c. The control detecting unit 223c comprises a detecting portion 2231c and a stopper portion 2233c. The detecting portion 2231c and the stopper portion 2233c are coupled to each other, and the detecting portion 2231c may drive the stopper portion 2233c to move. The detecting portion 2231c is coupled to the driving module 230c. When the driving module 230c is actuated, the detecting portion 2231c is driven to be displaced by the driving module 230c. During the expansion of the window covering system 10, when the driving module 230c is actuated and the stopper portion 2233c is engaged to the fitting unit 221c, the fitting unit 221c remains stationary, and the damping output module 210c provides damping to the driving module 230c. When the driving module 230c is actuated and drives the stopper portion 2233c apart from the fitting unit 221c, the driving module 230c operates independently of the damping output module 210c.

The damping control module 220c may further comprise an elastic unit 225c. The elastic unit 225c is coupled to the control detecting unit 223c. The elastic unit 225c provides a first force F1 to the control detecting unit 223c. During the expansion of the window covering system 10, the driving module 230c provides a second force F2 to the control detecting unit 223c. The second force F2 has an opposite direction to a direction of the first force F1. The elastic unit 225c is coupled to the detecting portion 2231c of the control detecting unit 223c and provides the first force F1 to the detecting portion 2231c. The control detecting unit 223c may further comprise a pivotal shaft 2235c. The stopper portion 2233c is driven by the first force F1 and the second force F2 to pivot about the pivotal shaft 2235c. The detecting portion 2231c and the stopper portion 2233c are located on different sides relative to the pivotal shaft 2235c. The elastic unit 225c is coupled to the detecting portion 2231c of the control detecting unit 223c and provides the first force F1 to the detecting portion 2231c.

When the driving module 230c is actuated and the stopper portion 2233c is engaged to the fitting unit 221c, the driving module 230c drives the first damping unit to move relative to the second damping unit 213c, thus the damping output module 210c provides damping to the driving module 230c. Specifically, the fitting unit 221c is coupled to the second damping unit 213c. The fitting unit 221c of the damping control module 220c, and the first damping unit, and the second damping unit 213c of the damping output module 210c are coaxial. When the driving module 230c is actuated and the stopper portion 2233c is engaged to the fitting unit 221c, the driving module 230c drives the first damping unit to rotate relative to the second damping unit 213c while the fitting unit 221c remains stationary. When the driving module 230c is continuously actuated and drives the stopper portion 2233c apart from the fitting unit 221c, the fitting unit 221c rotates synchronously with the driving module 230c, but the driving module 230c operates independently of the damping output module 210c. That is, when the driving module 230c is actuated continuously and the stopper portion 2233c is driven apart from the fitting unit 221c, the fitting unit 221c rotates synchronously with the drive wheel 2313c of the power assembly 231c, but the drive wheel 2313c operates independently of the first damping unit of the damping output module 210c. As shown in FIGS. 17-18, the fitting unit 221c is formed around an outer surface of the second damping unit 213c of the damping output module 210c. The fitting unit 221c, the first damping unit, and the second damping unit 213c are coaxial. The fitting unit 221c may be integrally formed with the second damping unit 213c. When the stopper portion 2233c is driven apart from the fitting unit 221c and the driving module 230c is actuated, the driving module 230c drives the first damping unit, the second damping unit 213c, and the fitting unit 221c to rotate synchronously.

It should be noted that when the driving module 230c is actuated continuously and the stopper portion 2233c is driven apart from the fitting unit 221c, the driving module 230c drives the first damping unit, the second damping unit 213c, and the fitting unit 221c to rotate synchronously, thus the damping output module 210c no longer provides damping to the driving module 230c. Specifically, when the driving module 230c is actuated continuously and the damping control module 220c is actuated, the damping control module 220c drives the first damping unit and the second damping unit 213c of the damping output module 210c to rotate synchronously. At this time, interactions between the first damping unit and the second damping unit 213c disappear, thus the damping output module 210c no longer provides damping to the driving module 230c, and the driving module 230c operates independently of the damper output module 210c. In other exemplary embodiments of the present disclosure, when the driving module 230c is actuated continuously and the damping control module 220c is actuated, the damping control module 220c may drive the first damping unit and the second damping unit 213c of the damping output module 210c to stop rotating. At this time, interactions between the first damping unit and the second damping unit 213c disappear, thus the damping output module 210c no longer provides damping to the driving module 230c. The driving module 230c operates independently of the damper output module 210c.

In the present exemplary embodiment, the damping output module 210c is an oil damping output module. A fluid is arranged between the first damping unit and the second damping unit 213c. The fluid may be air, water, or grease, but is not limited thereto. By the relative movement between the first damping unit and the second damping unit 213c, a fluid resistance is generated by the fluid relative to the first damping unit and the second damping unit 213c, thereby providing damping to the driving module 230c. It should be noted that the oil damping is described as example of the damping output module 210c of FIGS. 17-18, and should not be considered as a limitation of the implementation modes of the damping output module 210c. In other exemplary embodiments of the present disclosure, the damping output module 210c may use other damping types, such as friction damping, magnetic damping, or electrostatic damping. Multiple types of damping output modules may also be applied in one damping adjusting assembly to optimize the damping effect provided by the damping adjusting assembly to the window covering system.

Moreover, the detecting portion 2231c of the control detecting unit 223c abuts the lifting cord 221. The second force F2 is a tension force (not labeled) of the lifting cord 221. The tension force drives the stopper portion 2233c to engage to the fitting unit 221c. During the expansion of the window covering system 10, the tension force decreases gradually, the detecting portion 2231c is driven by the first force F1 to move toward the direction of the first force F1 while the detecting portion 2231c drives the stopper portion 2333c gradually apart from the fitting unit 221c. When the window covering system 10 is continuously expanded to a specific position, the first force F1 enables the detecting portion 2231c to drive the stopper portion 2233c apart from the fitting unit 221c, thus the fitting unit 221c and at least a part of the damping output module 210c are configured to operate simultaneously. The driving module 230c thus operates independently of the damping output module 210c. Specifically, when the window covering system 10 is continuously expanded to a specific position, the detecting portion 2231c is driven by the first force F1 to move toward the direction of the first force F1. The detecting portion 2231c drives the stopper portion 2233c apart from the fitting unit 221c gradually, thus the fitting unit 221c rotates synchronously with the first damping unit and the second damping unit 213c, but the drive wheel 2313c operates independently of the first damping unit of the damping output module 210c.

The window covering system 10 may further comprise an accelerator (not shown). The accelerator, the driving module 230c, and the damping output module 210c are configured to operate simultaneously. The accelerator is arranged between the driving module 230c and the damping output module 210c. The accelerator, being not a necessary component of the present disclosure, has been described in the previous exemplary embodiment, thus is not described herein. The window covering system 10 may further comprise a unidirectional controller (not shown). The unidirectional controller is connected to the driving module 230c and the damping output module 210c, and the unidirectional controller is arranged between the driving module 230c and the damping output module 210c. The unidirectional controller, being not a necessary component of the present disclosure, has been described in the previous exemplary embodiment, thus is not described herein.

In the present disclosure, the window covering system may effectively control the expansion of the covering material through the operation of the window covering control apparatus. The expanding of the covering material is made smoother. During the expansion of the covering material, the damping control module of the window covering control apparatus may continuously detect changes of the driving module, and control the damping output module to operate based on physical mechanics, therefore the covering material may be fully expanded and the smoothness of the expanding process may be enhanced.

The exemplary embodiments shown and described above are illustrative only, which are not intended to be exhaustive or to limit the present disclosure. Those skilled in the art may make many modifications and variations of the exemplary embodiments in light of the teaching of the present disclosure. It will therefore be appreciated that the exemplary embodiments described above may be modified within the scope of the claims.

What is claimed is:

1. A window covering control apparatus for controlling a window covering system, comprising a driving module, a damping output module, and a damping control module;
wherein the damping output module and the driving module are configured to operate simultaneously, the damping control module is coupled to the damping output module and the driving module, and the damping control module comprises a control detecting unit and a fitting unit;
wherein the control detecting unit comprises a detecting portion and a stopper portion, the detecting portion and the stopper portion are coupled to each other, the detecting portion is configured to drive the stopper portion to move, the driving module is coupled to the detecting portion, the detecting portion is driven to be displaced by the driving module;
the fitting unit is coupled to the damping output module, and the stopper portion is configured to be detachably engaged to the fitting unit;
wherein, the driving module is adapted to drive the detecting portion to be displaced during an expansion of the window covering system; while the window covering system is being expanded and when the stopper portion is still engaged to the fitting unit, the damping output module is adapted to be driven by the driving module to provide damping to the driving module; while the window covering system is still being expanded but the stopper portion has been disengaged from the fitting unit as a result of a displacement of the detecting portion driven by the driving module, the driving module is adapted to operate independently of the damping output module to stop the damping output module from providing damping.

2. The window covering control apparatus of claim 1, wherein the damping control module further comprises an elastic unit, wherein the elastic unit is coupled to the control detecting unit, and the elastic unit provides a first force to the detecting portion, wherein the first force acting on the detecting portion has a direction that is opposite to a direction of the detecting portion driven to be moved by the driving module.

3. The window covering control apparatus of claim 2, wherein the elastic unit is coupled to the detecting portion of the control detecting unit, and the elastic unit provides the first force to the control detecting unit.

4. The window covering control apparatus of claim 2, wherein the control detecting unit further comprises a pivotal shaft, the stopper portion and the detecting portion are coupled to the pivotal shaft, and the stopper portion and the detecting portion are capable of pivoting about the pivotal shaft.

5. The window covering control apparatus of claim 4, wherein the elastic unit is placed around the pivotal shaft, and the elastic unit provides the first force to the control detecting unit.

6. The window covering control apparatus of claim 2, wherein the driving module comprises a power assembly, a spool, and a lifting cord, the power assembly and the spool are configured to operate simultaneously, and the lifting cord is wound around the spool; during the expansion of the window covering system, the lifting cord drives the spool to rotate, and the power assembly is driven to actuate; wherein the power assembly comprises a spiral spring, a storage wheel, and a drive wheel, the storage wheel and the drive wheel are configured to operate simultaneously, the spiral spring comprises two ends, one of the two ends is mounted to the storage wheel and wound around the storage wheel, the other one of the two ends is mounted to the drive wheel and wound around the drive wheel; during the expansion of the window covering system, the spiral spring is wound from the storage wheel to the drive wheel.

7. The window covering control apparatus of claim 6, wherein the detecting portion of the control detecting unit abuts the lifting cord, the lifting cord comprises a tension force, and the tension force drives the stopper portion to engage to the fitting unit; during the expansion of the window covering system, the tension force decreases, the detecting portion is driven by the first force to move in a direction of the first force; when the stopper portion is driven apart by the detecting portion from the fitting unit, the damping output module no longer provides damping; and wherein the fitting unit and the damping output module are coaxial, and the damping output module adjoins the spool.

8. The window covering control apparatus of claim 6, wherein the detecting portion of the control detecting unit abuts the spiral spring wound around the drive module, and the spiral spring wound around the drive module has a diameter; during the expansion of the window covering system, the diameter of the spiral spring wound around the drive module changes to allow the detecting portion to move; when the stopper portion is driven apart by the detecting portion from the fitting unit, the damping output module no longer provides damping.

9. The window covering control apparatus of claim 8, wherein the spiral spring wound around the drive wheel comprises a first diameter, the detecting portion of the control detecting unit abuts the spiral spring wound around the drive wheel, and the first force drives the stopper portion to engage to the fitting unit; during the expansion of the window covering system, the first diameter increases gradually, and the detecting portion is driven to move away from an axis of the drive wheel; when the stopper portion is driven apart by the detecting portion from the fitting unit, the damping output module no longer provides damping; the fitting unit, the damping output module, and the drive wheel are coaxial.

10. The window covering control apparatus of claim 8, wherein the spiral spring wound around the storage wheel comprises a second diameter, and the detecting portion of the control detecting unit abuts the spiral spring wound around the storage wheel; during the expansion of the window covering system, the second diameter decreases gradually, and the detecting portion is driven by the first force to move toward an axis of the storage wheel; when the stopper portion is driven apart by the detecting portion from the fitting unit, the damping output module no longer provides damping; the fitting unit and the damping output module are coaxial, and the damping output module adjoins the storage wheel.

11. The window covering control apparatus of claim 6, wherein the damping output module comprises a first damping unit and a second damping unit, the first damping unit and the driving module are configured to operate simultaneously, the first damping unit is driven by the driving module to move relative to the second damping unit to allow the damping output module to provide damping to the driving module; the driving module drives the detecting portion to move, and the detecting portion drives the stopper portion to move; when the stopper portion is driven apart from the fitting unit, the first damping unit and the fitting unit are configured to operate simultaneously or stop a relative movement between the first damping unit and the fitting unit, and the damping output module no longer provides damping.

12. The window covering control apparatus of claim 11, wherein the damping output module further comprises a transmission, the first damping unit is between the transmission and the second damping unit; the transmission comprises a first transmission unit and a second transmission unit, the first transmission unit and the first damping unit are configured to operate simultaneously, and the first transmission unit, the second transmission unit, and the driving module are configured to operate simultaneously; the detecting portion is driven by the driving module to move, when the stopper portion is driven apart by the detecting portion from the fitting unit, according to a retarding force between the first damping unit and the second damping unit, the first damping unit and the first transmission unit stops rotating, and the damping output module no longer provides damping.

13. A window covering system comprising a headrail, a bottom rail, a covering material and a window covering control apparatus, the covering material is arranged between the headrail and the bottom rail, the window covering control apparatus is arranged in the headrail;

wherein the window covering control apparatus comprises a driving module, a damping output module, and a damping control module; the driving module comprises a lifting cord, the lifting cord extends from the driving module toward the bottom rail, and the lifting cord is coupled to the bottom rail through the covering material; the damping output module and the driving module are configured to operate simultaneously; the damping control module is coupled to the damping output module and the driving module, and the damping control module comprises a control detecting unit and a fitting unit;

wherein the control detecting unit comprises a detecting portion and a stopper portion, the detecting portion and the stopper portion are coupled to each other, the detecting portion is configured to drive the stopper portion to move, the driving module is coupled to the detecting portion, and the detecting portion is driven to be displaced by the driving module;

the fitting unit is coupled to the damping output module, and the stopper portion is configured to be detachably engaged to the fitting unit;

wherein, the driving module drives the detecting portion to be displaced during an expansion of the covering material; while the covering material is being expanded and when the stopper portion is still engaged to the fitting unit, the damping output module is driven by the driving module to provide damping to the driving module; when the bottom rail descends to a predetermined position during the expansion of the covering material, the stopper portion is driven apart by the detecting portion from the fitting unit, so that the driving module operates independently of the damping output module to stop the damping output module from providing damping.

14. The window covering system of claim 13, wherein the damping control module further comprises an elastic unit, wherein the elastic unit is coupled to the control detecting unit, and the elastic unit provides a first force to the detecting portion, wherein the first force acting on the detecting portion has a direction that is opposite to a direction of the detecting portion driven to be moved by the driving module.

15. The window covering system of claim 14, wherein the elastic unit is coupled to the detecting portion of the control detecting unit, and the elastic unit provides the first force to the detecting portion.

16. The window covering system of claim 14, wherein the control detecting unit further comprises a pivotal shaft, the stopper portion and the detecting portion are coupled to the pivotal shaft, and the stopper portion and the detecting portion are capable of pivoting about the pivotal shaft.

17. The window covering system of claim 16, wherein the elastic unit is placed around the pivotal shaft, and the elastic unit provides the first force to the control detecting unit.

18. The window covering system of claim 14, wherein the driving module further comprises a power assembly and a spool, the power assembly and the spool are configured to operate simultaneously, and the lifting cord is wound around the spool; when the bottom rail is descending, the lifting cord drives the spool to rotate, and the power assembly is driven to actuate; wherein the power assembly comprises a spiral spring, a storage wheel, and a drive wheel, the storage wheel and the drive wheel are configured to operate simultaneously, the spiral spring comprises two ends, one of the two ends is mounted to the storage wheel and wound around the storage wheel, the other one of the two ends is mounted to the drive wheel and wound around the drive wheel; during the expansion of the window covering system, the spiral spring is wound from the storage wheel to the drive wheel.

19. The window covering system of claim 18, wherein the detecting portion of the control detecting unit abuts the lifting cord, the lifting cord comprises a tension force, and the tension force drives the stopper portion to engage to the fitting unit;

wherein during the descending of the bottom rail, the tension force decreases, the detecting portion is driven by the first force to move in a direction of the first force; when the stopper portion is driven apart by the detecting portion from the fitting unit, the driving module operates independently of the damping output module; and wherein the fitting unit and the damping output module are coaxial, and the damping output module adjoins the spool.

20. The window covering system of claim 18, wherein the detecting portion of the control detecting unit abuts the spiral spring wound around the drive module, and the spiral spring wound around the drive module has a diameter; when the bottom rail is descending, the diameter of the spiral spring wound around the drive module changes to allow the detecting portion to move; when the stopper portion is driven apart by the detecting portion from the fitting unit, the damping output module no longer provides damping.

21. The window covering system of claim 20, wherein the spiral spring wound around the drive wheel comprises a first diameter, the detecting portion of the control detecting unit abuts the spiral spring wound around the drive wheel, and the first force drives the stopper portion to engage to the fitting unit; when the bottom rail is descending, the first diameter increases gradually, the detecting portion is driven to move away from an axis of the drive wheel; when the bottom rail descends to the position, the stopper portion is driven apart by the detecting portion from the fitting unit, the damping output module no longer provides damping; the fitting unit, the damping output module, and the drive wheel are coaxial.

22. The window covering control apparatus of claim 20, wherein the spiral spring wound around the storage wheel comprises a second diameter, and the detecting portion of the control detecting unit abuts the spiral spring wound around the storage wheel; wherein when the bottom rail is descending, the second diameter decreases gradually, the detecting portion is driven by the first force to move toward an axis of the storage wheel; when the bottom rail descends to the position, the stopper portion is driven apart by the detecting portion from the fitting unit, the damping output module no longer provides damping; the fitting unit and the damping output module are coaxial, and the damping output module adjoins the storage wheel.

23. The window covering control apparatus of claim 13, further comprising a unidirectional controller, wherein the unidirectional controller is coupled to the driving module and the damping output module, the unidirectional controller is arranged between the driving module and the damping output module;
  when the bottom rail is descending, the driving module drives the unidirectional controller to rotate toward a first direction and drives the damping output module to actuate, allowing the damping output module to provide damping to the driving module;
  when the bottom rail is ascending, the driving module rotates to a second direction, the second direction is opposite to the first direction, the unidirectional controller is configured to enable the driving module to rotate toward the second direction independently to the damping output module.

* * * * *